United States Patent
Inoue

(10) Patent No.: US 10,662,322 B2
(45) Date of Patent: May 26, 2020

(54) PROPYLENE POLYMER COMPOSITION

(71) Applicant: Sumitomo Chemical Company, Limited, Tokyo (JP)

(72) Inventor: Kazuya Inoue, Osaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 15/960,777

(22) Filed: Apr. 24, 2018

(65) Prior Publication Data

US 2018/0312675 A1 Nov. 1, 2018

(30) Foreign Application Priority Data

Apr. 27, 2017 (JP) ................. 2017-088013

(51) Int. Cl.
| | |
|---|---|
| *C08L 23/12* | (2006.01) |
| *C08L 23/08* | (2006.01) |
| *C08L 23/16* | (2006.01) |
| *C08K 3/013* | (2018.01) |
| *C08L 53/00* | (2006.01) |
| *C08L 23/14* | (2006.01) |

(52) U.S. Cl.
CPC .............. *C08L 23/12* (2013.01); *C08K 3/013* (2018.01); *C08L 23/08* (2013.01); *C08L 23/14* (2013.01); *C08L 23/16* (2013.01); *C08L 53/00* (2013.01); *C08L 2205/02* (2013.01); *C08L 2205/025* (2013.01); *C08L 2205/03* (2013.01); *C08L 2205/04* (2013.01); *C08L 2205/05* (2013.01); *C08L 2207/02* (2013.01)

(58) Field of Classification Search
CPC .......... C08L 53/00; C08L 23/12; C08L 23/16; C08L 23/14; C08L 2207/02
See application file for complete search history.

(56) References Cited

U.S. PATENT DOCUMENTS

| | | | |
|---|---|---|---|
| 4,259,230 A | 3/1981 | Simons | |
| 4,308,361 A * | 12/1981 | Fujii | C08F 210/06 525/247 |
| 2003/0049436 A1 * | 3/2003 | Hager | B32B 27/32 428/343 |
| 2004/0072957 A1 | 4/2004 | Grootaert et al. | |
| 2004/0176520 A1 | 9/2004 | Machida et al. | |
| 2011/0065865 A1 | 3/2011 | Bokhari et al. | |
| 2012/0208946 A1 * | 8/2012 | Shan | C08L 23/10 524/505 |
| 2013/0005931 A1 * | 1/2013 | Kawashima | C07C 2/34 526/352 |
| 2014/0163173 A1 | 6/2014 | Ishiwata et al. | |
| 2014/0275429 A1 | 9/2014 | Ishiwata et al. | |

FOREIGN PATENT DOCUMENTS

| | | |
|---|---|---|
| EP | 2031018 A1 | 3/2009 |
| JP | 19970241334 A | 9/1996 |
| JP | 2000119466 A | 4/2000 |
| JP | 2000119481 A | 4/2000 |
| JP | 2000154222 A | 6/2000 |
| JP | 2000336130 A | 12/2000 |
| JP | 2012236994 A | 12/2012 |
| JP | 2013151580 A | 8/2013 |
| WO | 200023489 A1 | 4/2000 |
| WO | 2003008497 A1 | 1/2003 |
| WO | 2008124127 A1 | 10/2008 |
| WO | 2009027516 A1 | 3/2009 |
| WO | 2011041696 A1 | 4/2011 |
| WO | 2013022103 A1 | 2/2013 |
| WO | 2013081080 A1 | 6/2013 |

OTHER PUBLICATIONS

Extended European Search Report dated Sep. 24, 2018 in European Application No. 18167685.9.
New edition Polypropylene Handbook, Nello Pasquini, Nikkan Kogyo Shimbun, Ltd., 2012, pp. 379-383.

* cited by examiner

*Primary Examiner* — Mark S Kaucher
(74) *Attorney, Agent, or Firm* — Panitch Schwarze Belisario & Nadel LLP

(57) ABSTRACT

A propylene polymer composition contains the following components (A), (B), and (C) and satisfies the requirements (1) to (4): Component (A): a propylene polymer, Component (B): an elastomer, Component (C): a propylene block copolymer; Requirement (1): the propylene polymer composition has a melting point of 100° C. or more; Requirement (2): the propylene polymer composition has a limiting viscosity of 1.0 dl/g or more; Requirement (3): at least one of the number-average molecular weight of a component insoluble in p-xylene at 25° C. of the propylene polymer composition and the number-average molecular weight of a component insoluble in n-heptane at 25° C. of the propylene polymer composition is 80000 or more; and Requirement (4): the ratio of the polystyrene-equivalent number-average molecular weight of the component (A) to the polystyrene-equivalent number-average molecular weight of the component (B) is 1.0 or more and 20 or less.

11 Claims, No Drawings

PROPYLENE POLYMER COMPOSITION

CROSS-REFERENCE TO RELATED APPLICATION

This application claims priority under 35 U.S.C. § 119(b) to Japanese Application No. 2017-088013, filed Apr. 27, 2017, the disclosure of which is incorporated herein by reference in its entirety.

TECHNICAL FIELD

The present invention relates to a propylene polymer composition.

BACKGROUND ART

Molded bodies comprising crystalline polypropylene have been widely used as automobile materials and home electronics materials.

For improving impact resistance of a molded body, a resin composition comprising crystalline polypropylene and an elastomer component is generally used.

Non-Patent document 1 describes a heterophasic propylene polymer comprising a propylene polymer component and an elastomer component obtained by multistage polymerization. Patent Document 1 describes a resin composition obtained by kneading a heterophasic propylene polymer and an elastomer.

PRIOR ART DOCUMENT

Patent Document

[Patent Document 1] JP-A No. 2013-151580

Non-Patent Document

[Non-Patent Document 1] New Edition Polypropylene Handbook, Nello Pasquini, Nikkan Kogyo Shimbun, Ltd., 2012, pp. 379 to 383

SUMMARY OF THE INVENTION

However, rigidity of a molded body comprising the resin composition has not been sufficient. In view of such current situation, the problem to be solved by the present invention is to provide a propylene polymer composition which is capable of giving a molded body excellent in impact resistance and rigidity.

The present invention includes inventions described in the following [1] to [11].

[1] A propylene polymer composition
comprising the following components (A), (B), and (C) and
satisfying the following requirements (1) to (4):

Component (A): a propylene polymer comprising a structural unit derived from propylene in an amount of 90% by weight or more when the total weight of the propylene polymer is 100% by weight;

Component (B): at least one elastomer selected from the group consisting of an ethylene-α-olefin copolymer having a structural unit derived from ethylene in an amount of more than 10% by weight and 99% by weight or less when the total weight of the ethylene-α-olefin copolymer is 100% by weight and a structural unit derived from an α-olefin having 3 to 10 carbon atoms, and a hydrogenated conjugated diene polymer;

Component (C): a propylene block copolymer comprising
a propylene polymer block (I) having a structural unit derived from propylene in an amount of 90% by weight or more when the total weight of the propylene polymer block is 100% by weight and
at least one elastomer block (II) selected from the group consisting of an ethylene-α-olefin copolymer block having a structural unit derived from ethylene in an amount of more than 10% by weight and 99% by weight or less when the total weight of the ethylene-α-olefin copolymer block is 100% by weight and a structural unit derived from an α-olefin having 3 to 10 carbon atoms and a hydrogenated conjugated diene polymer block;

Requirement (1): the propylene polymer composition has a melting point of 100° C. or more;

Requirement (2): the propylene polymer composition has a limiting viscosity of 1.0 dl/g or more;

Requirement (3): at least one of the number-average molecular weight of a component insoluble in p-xylene at 25° C. of the propylene polymer composition and the number-average molecular weight of a component insoluble in n-heptane at 25° C. of the propylene polymer composition is 80000 or more;

Requirement (4): the ratio of the polystyrene-equivalent number-average molecular weight of the component (A) to the polystyrene-equivalent number-average molecular weight of the component (B) is 1.0 or more and 20 or less.

[2] The propylene polymer composition according to claim 1, wherein the propylene polymer composition has a melting point of 145° C. or more.

[3] The propylene polymer composition according to [1] or [2], wherein the sum of the content of the component (B) contained in the component insoluble in p-xylene at 25° C. and the content of the elastomer block (II) of the component (C) contained in the component insoluble in p-xylene at 25° C. is 5 to 50% by weight when the amount of the component insoluble in p-xylene at 25° C. is 100% by weight.

[4] The propylene polymer composition according to [1] or [2], wherein the sum of the content of the component (B) contained in the component insoluble in n-heptane at 25° C. and the content of the elastomer block (II) of the component (C) contained in the component insoluble in n-heptane at 25° C. is 5 to 50% by weight when the amount of the component insoluble in n-heptane at 25° C. is 100% by weight.

[5] The propylene polymer composition according to any one of [1] to [4], wherein the content of the component (C) is 50% by weight or more when the total weight of the propylene polymer composition is 100% by weight.

[6] The propylene polymer composition according to any one of [1] to [5], wherein the component (B) is an ethylene-propylene copolymer, the elastomer block (II) of the component (C) is an ethylene-propylene copolymer block, and the composition satisfies the following Requirement (5):

Requirement (5): at least one of the absolute value of the difference between α and γ and the absolute value of the difference between β and γ is 10 or less, when the content of a structural unit derived from ethylene contained in a component insoluble in p-xylene at 25° C. is α % by weight when the sum of the content of the ethylene-propylene copolymer and the content of the ethylene-propylene copolymer block contained in the component insoluble in p-xylene at 25° C. of is 100% by weight, the content of a structural unit derived from ethylene contained in a component insoluble in n-heptane at 25° C. is β % by weight when the sum of the content of the ethylene-propylene copolymer and the content of the ethylene-propylene copolymer block contained in the component insoluble in n-heptane at 25° C. is 100% by weight, and the sum of the content of a structural unit derived from ethylene contained in the ethylene-propylene copolymer and the content of a structural unit derived from ethylene contained in the ethylene-propylene copolymer block is γ % by weight when the sum of the content of the ethylene-propylene copolymer and the content of the ethylene-propylene copolymer block in the propylene polymer composition is 100% by weight.

[7] The propylene polymer composition according to any one of [1] to [5], wherein the component (B) is an ethylene-α-olefin copolymer having a structural unit derived from ethylene in an amount of more than 10% by weight and 99% by weight or less when the total weight of the ethylene-α-olefin copolymer is 100% by weight and a structural unit derived from an α-olefin having 4 to 10 carbon atoms, the elastomer block (II) of the component (C) is an ethylene-α-olefin copolymer block having a structural unit derived from ethylene in an amount of more than 10% by weight and 99% by weight or less when the total weight of the ethylene-α-olefin copolymer block is 100% by weight and a structural unit derived from an α-olefin having 4 to 10 carbon atoms, the number of short chain branches of the ethylene-α-olefin copolymer is 10 to 200 when a total number of carbon atoms of 1000, and the number of short chain branches of the ethylene-α-olefin copolymer block is 10 to 200 when a total number of carbon atoms is 1000.

[8] The propylene polymer composition according to any one of [1] to [5], wherein the component (B) is the hydrogenated conjugated diene polymer, the elastomer block (II) of the component (C) is the hydrogenated conjugated diene polymer block, the number of short chain branches of the hydrogenated conjugated diene polymer is 10 to 200 when a total number of carbon atoms is 1000, and the number of short chain branches of the hydrogenated conjugated diene polymer block is 10 to 200 when a total number of carbon atoms of 1000.

[9] The propylene polymer composition according to any one of [1] to [8], wherein the ratio of the polystyrene-equivalent weight-average molecular weight of the propylene polymer composition to the polystyrene-equivalent number-average molecular weight of the propylene polymer composition is 1.5 or more and 3.0 or less.

[10] A mixture of a material (D) and the propylene polymer composition according to any one of [1] to [9], wherein at least one of the content of a component insoluble in p-xylene at 25° C. in polymer components contained in the mixture and the content of a component insoluble in n-heptane at 25° C. in polymer components contained in the mixture is 50 to 95% by weight when the total weight of the polymer components contained in the mixture is 100% by weigh;

Material (D): a heterophasic propylene polymer comprising a component (i) and a component (ii)

Component (i): a propylene polymer;

Component (ii): an ethylene-based copolymer.

[11] The mixture according to [10] further comprising an inorganic filler, wherein the content of the inorganic filler is 1 to 40% by weight when the total weight of the mixture is 100% by weight.

Effect of the Invention

According to the present invention, a propylene polymer composition capable of giving a molded body excellent in impact resistance and rigidity can be provided.

DETAILED DESCRIPTION OF THE INVENTION

The propylene polymer composition of the present invention comprises a component (A), a component (B) and a component (C).

<Component (A)>

The component (A) is a propylene polymer having a structural unit derived from propylene in an amount of 90% by weight or more when the total weight of the propylene polymer is 100% by weight.

The component (A) preferably has a highly stereoregular structure. Specifically, the component (A) has preferably an isotactic polypropylene structure or a syndiotactic polypropylene structure, more preferably an isotactic polypropylene structure.

In the present specification, the isotactic polypropylene structure is a structure in which the isotactic pentad fraction (hereinafter, referred to as [mmmm]) of the propylene polymer is 0.80 or more. The component (A) has preferably [mmmm] of 0.90 or more, more preferably 0.95 or more, from the standpoint of rigidity and heat resistance of the composition.

In the present specification, the syndiotactic polypropylene structure is a structure in which the syndiotactic pentad fraction (hereinafter, referred to as [rrrr]) of the propylene polymer is 0.70 or more. The component (A) has preferably [rrrr] of 0.80 or more, more preferably 0.90 or more, from the standpoint of rigidity and heat resistance of the composition.

The isotactic pentad fraction and the syndiotactic pentad fraction are determined from $^{13}C$ nuclear magnetic resonance spectrum (hereinafter, referred to as "$^{13}C$-NMR spectrum") according to a method described in Macromolecules, vol 6, pp. 925 to 926 (1973). The isotactic pentad fraction is isotactic fraction in continuous pentad units in the propylene-based polymer chain, and in the total absorption peaks in the methyl carbon region of $^{13}C$-NMR spectrum, the intensity fraction of the mmmm peak is the isotactic pentad fraction and the intensity fraction of the rrrr peak is the syndiotactic pentad fraction. Assignment of the peak in the NMR spectrum is performed based on a description of Macromolecules, vol. 8, p. 687 published in 1975.

The component (A) includes a propylene homopolymer, end-functionalized propylene polymer, and a propylene-α-olefin copolymer having a structural unit derived from propylene and a structural unit derived from at least one olefin selected from the group consisting of ethylene and α-olefins having 4 to 10 carbon atoms. The component (A) is preferably a propylene homopolymer.

The at least one olefin selected from the group consisting of ethylene and α-olefins having 4 to 10 carbon atoms includes ethylene, 1-butene, 1-hexene, and 1-octene. The structural unit derived from at least one olefin selected from the group consisting of ethylene and α-olefins having 4 to 10 carbon atoms is preferably a structural unit derived from ethylene. The content of the structural unit derived from an olefin contained in the propylene-α-olefin copolymer is 10% by weight or less, preferably 5% by weight or less, more preferably 3% by weight or less, still more preferably 2% by weight or less, particularly preferably 1% by weight or less.

The melting point of the component (A) is preferably 100° C. or more, more preferably 145° C. or more, still more preferably 150° C. or more, particularly preferably 155° C. or more, from the standpoint of rigidity and heat resistance of the composition. The melting point of the component (A) is usually 170° C. or less.

In the present specification, the melting point is the top temperature of melting peak obtained by analyzing the melting curve measured by the following differential scanning calorimetry by a method according to JIS K7121-1987, where the melt endothermic energy amount is maximum. When the melting curve has a plurality of melting peaks defined by JIS K7121-1987, the top temperature of the melting peaks wherein the melt endothermic energy amount is maximum is the melting point.

[Differential Scanning Calorimetry]

Using a differential scanning calorimeter, an aluminum pan having about 5 mg of an enclosed sample is (1) kept at 220° C. for 5 minutes, then, (2) cooled from 220° C. to −90° C. at a rate of 10° C./min, then, (3) heated from −90° C. to 220° C. at a rate of 10° C./min, under a nitrogen atmosphere. The differential scanning calorimetry curve obtained by calorimetry in step (3) is the melting curve.

The polystyrene-equivalent number-average molecular weight (hereinafter, referred to as "Mn") of the component (A) is preferably 40,000 or more, more preferably 60,000 or more, still more preferably 70,000 or more, still more preferably 80,000 or more, from the standpoint of impact resistance. Mn of the component (A) is usually 500,000 or less. The Mn and the weight-average molecular weight (hereinafter, referred to as "Mw") described later are measured by gel permeation chromatography (hereinafter, referred to as "GPC").

The molecular weight distribution of the component (A) is usually 1.5 or more and 3.5 or less. The molecular weight distribution is defined by the ratio of the weight-average molecular weight (Mw) to the number-average molecular weight (Mn), that is, Mw/Mn.

<Component (B)>

The component (B) is at least one elastomer selected from the group consisting of an ethylene-α-olefin copolymer having a structural unit derived from ethylene in an amount of more than 10% by weight and 99% by weight or less when the total weight of the ethylene-α-olefin copolymer is 100% by weight and a structural unit derived from an α-olefin having 3 to 10 carbon atoms and a hydrogenated conjugated diene polymer.

[Ethylene-α-Olefin Copolymer]

The ethylene-α-olefin copolymer is a copolymer having a structural unit derived from ethylene in an amount of more than 10% by weight and 99% by weight or less when the total weight of the ethylene-α-olefin copolymer is 100% by weight and a structural unit derived from an α-olefin having 3 to 10 carbon atoms.

The α-olefin having 3 to 10 carbon atoms includes propylene, 1-butene, 1-hexene, 4-methyl-1-pentene, 1-octene, and 1-decene. The structural unit derived from an α-olefin in the ethylene-α-olefin copolymer is preferably a structural unit derived from propylene, a structural unit derived from 1-butene, a structural unit derived from 1-hexene or a structural unit derived from 1-octene, more preferably a structural unit derived from propylene or a structural unit derived from 1-butene. The ethylene-α-olefin copolymer may have only one kind of the structural unit derived from an α-olefin having 3 to 10 carbon atoms or may have two or more kinds of the structural units.

When the ethylene-α-olefin copolymer is an ethylene-propylene copolymer, the content of a structural unit derived from ethylene in the ethylene-propylene copolymer is preferably more than 10% by weight and 90% by weight or less, more preferably 15% by weight or more and 80% by weight or less, still more preferably 20% by weight or more and 70% by weight or less. The content of a structural unit derived from ethylene in the ethylene-propylene copolymer is preferably more than 10% by weight from the standpoint of compatibility of the propylene polymer composition with a heterophasic propylene polymer described later and is preferably 90% by weight or less from the standpoint of impact resistance of the resultant molded body.

When the ethylene-α-olefin copolymer is an ethylene-α-olefin copolymer having a structural unit derived from ethylene in an amount of more than 10% by weight and 99% by weight or less when the total weight of the ethylene-α-olefin copolymer is 100% by weight and a structural unit derived from an α-olefin having 4 to 10 carbon atoms, the number of short chain branches of the ethylene-α-olefin copolymer is preferably 10 to 200, more preferably 20 to 150, still more preferably 30 to 100 when a total number of carbon atoms of the ethylene-α-olefin copolymer is 1000. In the present specification, "short chain branch" of the ethylene-α-olefin copolymer denotes an alkyl group having 2 to 8 carbon atoms bonded to a tertiary carbon atom of the main chain of the polymer. The number of short chain branches is determined from the $^{13}$C-NMR spectrum. The number of short chain branches of the ethylene-α-olefin copolymer is preferably 10 or more from the standpoint of impact resistance of the resultant molded body and is preferably 200 or less from the standpoint of rigidity and heat resistance of the resultant molded body.

[Hydrogenated Conjugated Diene Polymer]

The hydrogenated conjugated diene polymer is a completely or partially hydrogenated material of a conjugated diene polymer. The conjugated diene includes 1,3-butadiene, isoprene, 1,3-pentadiene, 2-methyl-1,3-pentadiene, 1,3-hexadiene, and chloroprene. The conjugated diene is preferably 1,3-butadiene or isoprene. The hydrogenated conjugated diene polymer may have only one kind of the structural unit derived from a conjugated diene or may have two or more kinds of the structural units. The hydrogenated conjugated diene polymer includes a homopolymer consisting of a structural unit derived from a conjugated diene, and a copolymer having a structural unit derived from a conjugated diene and a structural unit derived from the other monomer(s). The content of a structural unit derived from a conjugated diene in the hydrogenated conjugated diene polymer is preferably 50% by weight or more, more preferably 70% by weight or more, still more preferably 80% by weight or more.

The other monomer includes aromatic vinyl compounds such as styrene, α-methylstyrene, p-methylstyrene, p-ethylstyrene, p-tert-butylstyrene, 1,1-diphenylethylene, vinylnaphthalene, vinylanthracene, and vinylpyridine; α,β-unsaturated carbonyl compounds such as methyl acrylate, ethyl acrylate, butyl acrylate, methyl methacrylate, ethyl methacrylate, acrolein, and maleic anhydride, and acrylonitrile. The hydrogenated conjugated diene polymer may have two or more kinds of structural units derived from these other monomers.

The hydrogenated conjugated diene polymer is obtained by partially or completely hydrogenating a carbon-carbon double bond contained in the conjugated diene polymer (excluding a carbon-carbon double bond in an aromatic ring).

The hydrogenation rate is usually 50% or more, and it is preferably 70% or more, more preferably 80% or more, still more preferably 90% or more, from the standpoint of prevention of degradation and coloration of the composition due to heat, oxygen and light and improvement of weather resistance.

The hydrogenation method includes a method described in JP-A No. Hei-11-71426.

The number of short chain branches of the hydrogenated conjugated diene polymer is preferably 10 to 200, more preferably 20 to 150, still more preferably 30 to 100 when a total number of carbon atoms of the hydrogenated conjugated diene polymer is 1000. "Short chain branch" of the hydrogenated conjugated diene polymer denotes an alkyl group having 2 to 8 carbon atoms bonded to a tertiary carbon atom of the main chain of the polymer. The number of short chain branches is determined from the $^{13}$C-NMR spectrum. The number of short chain branches of the hydrogenated conjugated diene polymer is preferably 10 or more from the standpoint of impact resistance of the resultant molded body and is preferably 200 or less from the standpoint of rigidity and heat resistance of the resultant molded body.

The polystyrene-equivalent number-average molecular weight (hereinafter, referred to as "Mn(B)") of the component (B) is preferably 15,000 or more, more preferably 20,000 or more, still more preferably 22,000 or more, particularly preferably 24,000 or more. The Mn (B) is usually 500,000 or less, from the standpoint of melt dispersibility of the component (C) in the composition.

The molecular weight distribution of the component (B) is usually 1.0 or more and 3.5 or less.

The component (B) may be an end-functionalized elastomer described later.

<Component (C)>

The component (C) is a propylene block copolymer comprising a propylene polymer block (I) having a structural unit derived from propylene in an amount of 90% by weight or more when the total weight of the propylene polymer block is 100% by weight and at least one elastomer block (II) selected from the group consisting of an ethylene-α-olefin copolymer block having a structural unit derived from ethylene in an amount of more than 10% by weight and 99% by weight or less when the total weight of the ethylene-α-olefin copolymer block is 100% by weight and a structural unit derived from an α-olefin having 3 to 10 carbon atoms and a hydrogenated conjugated diene polymer block.

The component (C) is a propylene block copolymer in which at least one end of the propylene polymer block (I) and at least one end of the elastomer block (II) are covalently bonded. The component (C) may be a diblock copolymer consisting one propylene polymer block (I) and one elastomer block (II), or may be a multiblock copolymer having a number of blocks of 3 or more and containing a plurality of propylene polymer blocks (I) and/or elastomer blocks (II).

[Propylene Polymer Block (I)]

The propylene polymer block (I) is a propylene polymer block having a structural unit derived from propylene in an amount of 90% by weight or more when the total weight of the propylene polymer block is 100% by weight.

It is preferable that the propylene polymer block (I) has the same composition as that of the component (A) contained in the propylene polymer composition. A kind and content of a structural unit contained in the propylene polymer block (I) is preferably the same as those the component (A), respectively.

The propylene polymer block (I) preferably has a highly stereoregular structure. Specifically, the propylene polymer block (I) preferably has an isotactic polypropylene structure or a syndiotactic polypropylene structure, more preferably has an isotactic polypropylene structure.

When the propylene polymer block (I) is an isotactic polypropylene structure, the propylene polymer block (I) has preferably [mmmm] of 0.80 or more, more preferably 0.90 or more, still more preferably 0.95 or more, from the standpoint of rigidity and heat resistance of the composition.

When the propylene polymer block (I) is a syndiotactic polypropylene structure, the propylene polymer block (I) has [rrrr] of preferably 0.070 or more, more preferably 0.80 or more, still more preferably 0.90 or more, from the standpoint of rigidity and heat resistance of the composition.

The propylene polymer block (I) includes a propylene homopolymer block, and a propylene-α-olefin copolymer block having a structural unit derived from propylene and a structural unit derived from at least one α-olefin selected from the group consisting of ethylene and α-olefins having 4 to 10 carbon atoms. The propylene polymer block (I) is preferably a propylene homopolymer block. The at least one α-olefin selected from the group consisting of ethylene and α-olefins having 4 to 10 carbon atoms includes ethylene, 1-butene, 1-hexene, and 1-octene. The structural unit derived from at least one α-olefin selected from the group consisting of ethylene and α-olefins having 4 to 10 carbon atoms is preferably a structural unit derived from ethylene. The content of the structural unit derived from an α-olefin contained in the propylene-α-olefin copolymer block is 10% by weight or less, preferably 5% by weight or less, more preferably 3% by weight or less, still more preferably 2% by weight or less, still more preferably 1% by weight or less.

The melting point of the propylene polymer block (I) is preferably 100° C. or more, more preferably 145° C. or more, still more preferably 150° C. or more, particularly preferably 155° C. or more, from the standpoint of rigidity and heat resistance of the composition.

The polystyrene-equivalent number-average molecular weight of the propylene polymer block (I) (hereinafter, referred to as "Mn(I)") is preferably 40,000 or more, more preferably 60,000 or more, still more preferably 70,000 or more, still more preferably 80,000 or more, from the standpoint of impact resistance. The Mn(I) is usually 500,000 or less from the standpoint of melt dispersibility of the component (C) in the composition.

The molecular weight distribution of the propylene polymer block (I) is usually 1.5 or more and 3.5 or less.

[Elastomer block (II)]

The elastomer block (II) is at least one elastomer block selected from the group consisting of an ethylene-α-olefin copolymer block having a structural unit derived from ethylene in an amount of more than 10% by weight and 99% by weight or less when the total weight of the ethylene-α-olefin copolymer block is 100% by weight and a structural unit derived from an α-olefin having 3 to 10 carbon atoms and a hydrogenated conjugated diene polymer block.

It is preferable that elastomer block (II) has the same composition as that of the component (B) contained in the propylene polymer composition. The elastomer block (II) is the same as the kind and the content of a structural unit contained in the component (B).

[Ethylene-α-Olefin Copolymer Block]

The ethylene-α-olefin copolymer block is a copolymer block having a structural unit derived from ethylene in an amount of more than 10% by weight and 99% by weight or less when the total weight of the ethylene-α-olefin copolymer block is 100% by weight and a structural unit derived from an α-olefin having 3 to 10 carbon atoms.

The α-olefin having 3 to 10 carbon atoms includes propylene, 1-butene, 1-hexene, 4-methyl-1-pentene, 1-octene, and 1-decene. The structural unit derived from an α-olefin in the ethylene-α-olefin copolymer block is preferably a structural unit derived from propylene, a structural unit derived from 1-butene, a structural unit derived from 1-hexene or a structural unit derived from 1-octene, more preferably a structural unit derived from propylene or a structural unit derived from 1-butene. The ethylene-α-olefin copolymer block may contain only one kind of the structural unit derived from an α-olefin having 3 to 10 carbon atoms or may contain two or more kinds of the structural units.

When the ethylene-α-olefin copolymer block is an ethylene-propylene copolymer block, the content of the structural unit derived from ethylene in the ethylene-propylene copolymer block is preferably more than 10% by weight and 90% by weight or less, more preferably 15% by weight or more and 80% by weight or less, still more preferably 20% by weight or more and 70% by weight or less. The content of the structural unit derived from ethylene in the ethylene-α-olefin copolymer block is preferably more than 10% by weight from the standpoint of compatibility of the propylene polymer composition with a heterophasic propylene polymer described later, and preferably 90% by weight or less from the standpoint of impact resistance of the resultant molded body.

When the ethylene-α-olefin copolymer block is an ethylene-α-olefin copolymer block having a structural unit derived from ethylene in an amount of more than 10% by weight and 99% by weight or less when the total weight of the ethylene-α-olefin copolymer block is 100% by weight and a structural unit derived from an α-olefin having 4 to 10 carbon atoms, the number of short chain branches of the ethylene-α-olefin copolymer block is preferably 10 to 200, more preferably 20 to 150, still more preferably 30 to 100 when a total number of carbon atoms of the ethylene-α-olefin copolymer block is 1000. "Short chain branch" of the ethylene-α-olefin copolymer block denotes an alkyl group having 2 to 8 carbon atoms bonded to a tertiary carbon atom of the main chain of the polymer. The number of short chain branches is determined from the $^{13}$C-NMR spectrum. The number of short chain branches of the ethylene-α-olefin copolymer block is preferably 10 or more from the standpoint of impact resistance of the resultant molded body and is preferably 200 or less from the standpoint of rigidity and heat resistance of the resultant molded body.

[Hydrogenated Conjugated Diene Polymer Block]

The hydrogenated conjugated diene polymer block is a completely or partially hydrogenated material of a conjugated diene polymer block. The conjugated diene includes 1,3-butadiene, isoprene, 1,3-pentadiene, 2-methyl-1,3-pentadiene, 1,3-hexadiene, and chloroprene. The conjugated diene is preferably 1,3-butadiene or isoprene. The hydrogenated conjugated diene polymer block may have only one kind of the structural unit derived from a conjugated diene or may have two or more kinds of the structural units. The hydrogenated conjugated diene polymer block includes a homopolymer block consisting of a structural unit derived from a conjugated diene, and a copolymer block having a structural unit derived from a conjugated diene and a structural unit derived from the other monomer(s). The content of the structural unit derived from a conjugated diene in the hydrogenated conjugated diene block is preferably 50% by weight or more, more preferably 70% by weight or more, still more preferably 80% by weight or more.

The other monomer includes aromatic vinyl compounds such as styrene, α-methylstyrene, p-methylstyrene, p-ethylstyrene, p-tert-butylstyrene, 1,1-diphenylethylene, vinylnaphthalene, vinylanthracene, and vinylpyridine; α,β-unsaturated carbonyl compounds such as methyl acrylate, ethyl acrylate, butyl acrylate, methyl methacrylate, ethyl methacrylate, acrolein, and maleic anhydride; and acrylonitrile. The hydrogenated conjugated diene polymer block may have two or more kinds of structural units derived from the other monomers.

The hydrogenated conjugated diene polymer block is obtained by partially or completely hydrogenating a carbon-carbon double bonds contained in the conjugated diene polymer block (excluding a carbon-carbon double bonds in an aromatic ring). The hydrogenation rate is usually 50% or more, and it is preferably 70% or more, more preferably 80% or more, still more preferably 90% or more, from the standpoint of prevention of degradation and coloration of the composition due to heat, oxygen and light and improvement of weather resistance.

The hydrogenation method includes a method described in JP-A No. Hei-11-71426.

The number of short chain branches of the hydrogenated conjugated diene polymer block is preferably 10 to 200, more preferably 20 to 150, still more preferably 30 to 100 when a total number of carbon atoms of the hydrogenated conjugated diene polymer block is 1000. "Short chain branch" of the hydrogenated conjugated diene polymer block denotes an alkyl group having 2 to 8 carbon atoms bonded to a tertiary carbon atom of the main chain of the polymer. The number of short chain branches is determined from the $^{13}$C-NMR spectrum. The number of short chain branches of the hydrogenated conjugated diene polymer block is preferably 10 or more from the standpoint of impact resistance of the resultant molded body and preferably 200 or less from the standpoint of rigidity and heat resistance of the resultant molded body.

The polystyrene-equivalent number-average molecular weight of the elastomer block (II) (hereinafter, referred to as "Mn(II)") is preferably 15,000 or more, more preferably 20,000 or more, still more preferably 22,000 or more, still more preferably 24,000 or more. The Mn(II) is usually 500,000 or less from the standpoint of melt dispersibility of the component (C) in the composition.

The molecular weight distribution of the elastomer block (II) is usually 1.0 or more and 3.5 or less.

<Requirement (1)>

The propylene polymer composition has a melting point of 100° C. or more. The melting point of the propylene polymer composition is preferably 145° C. or more and usually 170° C. or less. The propylene polymer composition may have two or more melting points. Among the melting points of the propylene polymer composition, the highest melting point is preferably 150° C. or more, more preferably 155° C. or more, from the standpoint of rigidity and heat resistance of the resultant molded body.

The melting point usually depends on the melting points of the components (A), (B) and (C).

The melting point of the propylene polymer component can be 100° C. or more when at least one of the melting points of components (A), (B) and (C) is 100° C. or more.

The melting point of the component (A) and/or the melting point of the component (C) is preferably 100° C. or more.

The melting point of the component (A) can be controlled by adjusting the content of the structural unit derived from propylene in the component (A).

The melting point of the component (A) can be higher when the content of the structural unit derived from propylene in the component (A) increases.

The melting point of the component (C) can be higher when the content of the structural unit derived from the propylene in the propylene polymer block (I), wherein the content of the propylene polymer block is 30% by weight to 95% by weight.

When the propylene polymer block (I) is the block derived from the component (A) and the content of the propylene block polymer (I) is 30% by weight to 95% by weight, the melting point of the component (A) is almost identical with the melting point of the component (C). Therefore, the melting point of the propylene polymer composition can be 100° C. or more when the melting point of the component (A) is 100° C. or more.

<Requirement (2)>

The propylene polymer composition has a limiting viscosity (hereinafter, written as [η] in some cases) of 1.0 dl/g or more, preferably 1.2 dl/g or more, more preferably 1.4 dl/g or more. The [η] of the propylene polymer composition is usually 3.0 dl/g or less.

The [η] of the propylene polymer composition can be controlled by adjusting the [η] of the components (A), (B) and (C) and the contents of the components (A), (B) and (C).

The [η] of the major component among the components (A), (B) and (C) is preferably 1.0 dl/g or more.

The [η] of the propylene polymer composition can be 1.0 dl/g or more, when the content of the component (C) is 50% by weight to 99.9% by weight with respect to the total content of the propylene polymer composition and the [η] of the component (C) is 1.0 dl/g or more.

The larger the molecular weight of the components (A), (B) and (C) is, the larger the [η] of the components (A), (B) and (C) is.

In the present specification, the limiting viscosity is measured in tetralin at a temperature of 135° C.

Hereinafter, the component insoluble in p-xylene at 25° C. of the propylene polymer composition is referred to as "CXIS", in the present specification. The component soluble in p-xylene at 25° C. of the propylene polymer composition is referred to as "CXS". The component insoluble in n-heptane at 25° C. of the propylene polymer composition is referred to as "CHIS". The component soluble in n-heptane at 25° C. of the propylene polymer composition is referred to as "CHS".

CXIS and CXS are usually obtained by the following method. To the propylene polymer composition is added p-xylene. The resultant mixture is heated to dissolution, then, cooled down to 5° C., and thereafter, allowed to stand still at 25° C. for 2 hours. The polymer precipitated after standing still is CXIS. The polymer contained in the p-xylene solution after separation of CXIS by filtration is CXS.

CHIS and CHS are usually obtained by the following method. To the propylene polymer composition is added n-heptane. The resultant mixture is stirred at 25° C. for 6 hours, and the insoluble component after stirring is CHIS. The polymer contained in the n-heptane solution after separation of CHIS by filtration is CHS.

<Requirement (3)>

At least one of the number-average molecular weight of CXIS and the number-average molecular weight of CHIS is 80,000 or more, and it is preferably 90,000 or more, more preferably 110,000 or more, still more preferably 125,000 or more, from the standpoint of impact resistance of the resultant molded body. The number-average molecular weight is usually 800,000 or less.

The number-average molecular weight of the CXIS can be controlled by adjusting the number-average molecular weight of the component (A) and/or (C).

The number-average molecular weight of the CXIS can be 80,000 or more when the number-average molecular weight of the components (A) and (C) is 80,000 or more.

The number-average molecular weight of the CXIS can be 80,000 or more when the number-average molecular weight of the component (C) is 80,000 or more and the content of the component (C) is 50% by weight to 99.9% by weight with respect to the total content of the propylene polymer composition.

Both of the number-average molecular weight of CXIS and the number-average molecular weight of CHIS may be 80,000 or more.

"The number-average molecular weight" in the Requirement (3) is the polystyrene-equivalent number-average molecular weight.

<Requirement (4)>

In the propylene polymer composition, Mn(pp)/Mn(el) is 1.0 or more and 20 or less, preferably 1.2 or more and 15 or less, more preferably 1.5 or more and 10 or less, when the polystyrene-equivalent number-average molecular weight of the component (A) contained in the propylene polymer composition is represented by Mn(pp) and the polystyrene-equivalent number-average molecular weight of the component (B) contained in the propylene polymer composition is represented by Mn(el). Mn(pp)/Mn(el) is preferably 1.2 or more from the standpoint of rigidity and heat resistance of the resultant molded body and is preferably 15 or less from the standpoint of impact resistance of the resultant molded body.

The Mn of components (A) and (B) contained in the propylene polymer composition are adjusted to satisfy the requirement (4).

The sum of the content of the component (B) and the content of the elastomer block (II) contained in CXIS is preferably 5 to 50% by weight, more preferably 6 to 45% by weight, still more preferably 8 to 40% by weight or less when the weight of CXIS is 100% by weight. The sum of the content of the component (B) and the content of the elastomer block (II) is preferably 5% by weight or more from the standpoint of impact resistance of the resultant molded body and is preferably 50% by weight or less from the standpoint of rigidity and heat resistance of the resultant molded body.

In the CXIS, the content of the component (C) is usually larger than that of the component (B).

The content of the elastomer block (II) is almost inversely proportional to the Mn(pp)/Mn(el) when the raw material of the component (C) is the components (A) and (B) and the major component of the propylene polymer composition is the component (C).

The sum of the content of the component (B) contained in CXIS and the content of the elastomer block (II) contained in CXIS can be 5% by weight to 50% by weight when Mn(pp)/Mn(el) is 1.0 or more to 20 or less, the content of the component (C) is 50% by weight to 99.9% by weight with respect to the total content of the propylene polymer composition.

The sum of the content of the component (B) and the content of the elastomer block (II) contained in CHIS is preferably 5 to 50% by weight, more preferably 6 to 45% by weight, still more preferably 8 to 40% by weight or less when the weight of the CHIS is 100% by weight. The sum of the content of the component (B) and the content of the elastomer block (II) is preferably 5% by weight or more from the standpoint of impact resistance of the resultant molded body and is preferably 50% by weight or less from the standpoint of rigidity and heat resistance of the resultant molded body.

The CHIS usually comprises the content of the component (C) in larger amount than that of the component (B).

The content of the elastomer block (II) is almost inversely proportional to the Mn(pp)/Mn(el) when the material of the component (C) is the components (A) and (B) and the major component of the propylene polymer composition is the component (C).

The sum of the content of the component (B) contained in CHIS and the content of the elastomer block (II) contained in CHIS can be 5% by weight to 50% by weight when Mn(pp)/Mn(el) is 1.0 or more to 20 or less, the content of the component (C) is 50% by weight to 99.9% by weight with respect to the total content of the propylene polymer composition.

It is preferable that the propylene polymer composition satisfies the following Requirement (5) when the component (B) is an ethylene-propylene copolymer and the elastomer block (II) is an ethylene-propylene copolymer block.

Requirement (5): at least one of the absolute value of the difference between $\alpha$ and $\gamma$ and the absolute value of the difference between $\beta$ and $\gamma$ is 10 or less when the content of a structural unit derived from ethylene contained in a component insoluble in p-xylene at 25° C. of the propylene polymer composition is $\alpha$ % by weight when the sum of the content of the ethylene-propylene copolymer and the content of the ethylene-propylene copolymer block contained in the component insoluble in p-xylene at 25° C. of the propylene polymer composition is 100% by weight, the content of a structural unit derived from ethylene contained in a component insoluble in n-heptane at 25° C. of the propylene polymer composition is 1% by weight when the sum of the content of the ethylene-propylene copolymer and the content of the ethylene-propylene copolymer block contained in the component insoluble in h-heptane at 25° C. of the propylene polymer composition is 100% by weight, and the sum of the content of a structural unit derived from ethylene contained in the ethylene-propylene copolymer and the content of a structural unit derived from ethylene contained in the ethylene-propylene copolymer block is $\gamma$ % by weight when the sum of the content of the ethylene-propylene copolymer and the content of the ethylene-propylene copolymer block in the propylene polymer composition is 100% by weight.

Both the absolute value of the difference between $\alpha$ and $\gamma$ and the absolute value of the difference between $\beta$ and $\gamma$ may be 10 or less.

At least one of the absolute value of the difference between $\alpha$ and $\gamma$ and the absolute value of the difference between $\beta$ and $\gamma$ is more preferably 8 or less, still more preferably 7 or less.

The Requirement (5) indicates that the sum of the content of a structural unit derived from ethylene contained in the ethylene-propylene copolymer in the propylene polymer composition and the content of a structural unit derived from ethylene contained in the ethylene-propylene copolymer block is the almost same as the content of a structural unit derived from ethylene contained in ethylene-propylene copolymer block present in CXIS or CHIS. The sum of the content of a structural unit derived from ethylene contained in the ethylene-propylene copolymer in the propylene polymer composition and the content of a structural unit derived from ethylene contained in the ethylene-propylene copolymer block is the almost same as the content of a structural unit derived from ethylene contained in ethylene-propylene copolymer block present in CXS or CHS. This means that the ethylene-propylene copolymer component which originally should be soluble in p-xylene or n-heptane remains in CXIS or CHIS without being extracted into p-xylene or n-heptane, that is, this means the propylene polymer block (I) insoluble in p-xylene and n-heptane and the ethylene-propylene copolymer block are covalently bonded.

This phenomenon is clearly distinguished from the case in which a component of relatively high crystallinity exists in an component (ii) described in the following [0084] and remains without being extracted into p-xylene or n-heptane, in a simple blend polymer in which a covalent bond is not present between a component (i) described in the following [0081] and an component (ii), generally called a heterophasic propylene polymer. The reason for this is that when a highly crystalline component insoluble in p-xylene or n-heptane is present in an component (ii), this component has higher ethylene content or higher propylene content as compared with an amorphous component which is extracted with p-xylene or n-heptane, and deviation is present between the ethylene content in an component (ii) contained in a heterophasic propylene polymer and the ethylene content in an ethylene-based copolymer present in CXIS or CHIS of a heterophasic propylene polymer.

The sum of the contents of the component (B) contained in the propylene polymer composition, CXIS and CHIS of the propylene polymer composition and the content of the elastomer block (II), the content of a structural unit derived from ethylene and the content of a structural unit derived from an $\alpha$-olefin are determined from the $^{13}$C-NMR spectrum based on the report of Kakugo, et al., Macromolecules 1982, vol. 15, pp. 1150 to 1152. They can also be calculated from the crystal melting heat quantity obtained by differential scanning calorimetry (DSC).

The CXS and CHS components contained in the propylene polymer composition contain an ethylene-$\alpha$-olefin copolymer or a hydrogenated conjugated diene type polymer not bonded to the propylene polymer block (I). Each of the content of the CXS component and the content of the CHS component is preferably 50% by weight or less, more preferably 30% by weight or less, still more preferably 20% by weight or less, from the standpoint of rigidity and heat resistance of the resultant molded body.

The content of the component (C) is preferably 50% by weight or more, more preferably 60% by weight or more, still more preferably 65% by weight or more, still more preferably 70% by weight or more, from the standpoint of impact resistance of the resultant molded body, when the total weight of the propylene polymer composition is 100% by weight.

The content of the component (C) is usually 99.9% by weight.

The sum of the content of the component (A) and the content of the component (B) is preferably 50% by weight or more, more preferably 40% by weight, still more preferably 35% by weight, particularly preferably 30% by weight, when the total weight of the propylene polymer composition is 100% by weight. The sum of the content of the component (A) and the content of the component (B) is usually 0.1% by weight or more.

The content y (% by weight) of the component (C) when the total weight of the propylene polymer composition is 100% by weight can be determined by the following formula (3), when the component (B) contained in the propylene polymer composition is an ethylene-propylene copolymer, the elastomer block (II) is an ethylene-propylene copolymer block, the composition of the ethylene-propylene copolymer and the composition of the ethylene-propylene copolymer block are identical and the composition of the component (A) and the composition of the propylene polymer block (I) are identical.

$$y = z \times \{(C2_{IS} - C2_{PP})/(C2_{EP} - C2_{PP})\} \times \{(Mn_{PP} + Mn_{EP})/Mn_{EP}\} \quad (3)$$

z represents the content (% by weight) of CXIS or CHIS contained in the propylene polymer composition, the weight of the propylene polymer composition being 100% by weight.

$C2_{IS}$ represents the content (% by weight) of a structural unit derived from ethylene contained in CXIS or CHIS, the weight of CXIS or CHIS being 100% by weight.

$C2_{PP}$ represents the content (% by weight) of a structural unit derived from ethylene contained in the propylene polymer block (I), the weight of the propylene polymer block (I) being 100% by weight.

$C2_{EP}$ represents the content (% by weight) of a structural unit derived from ethylene contained in the elastomer block (II), the weight of the elastomer block (II) being 100% by weight.

$Mn_{PP}$ represents the number-average molecular weight of the propylene polymer block (I).

$Mn_{EP}$ represents the number-average molecular weight of the elastomer block (II).

The content y (% by weight) of the component (C) when the total weight of the propylene polymer composition is 100% by weight can be determined by the following formula (4), when the component (B) contained in the propylene polymer composition is the ethylene-α-olefin copolymer other than the ethylene-propylene copolymer, the elastomer block (II) is the ethylene-α-olefin copolymer block other than the ethylene-propylene copolymer block, the composition of the ethylene-α-olefin copolymer and the composition of the ethylene-α-olefin copolymer block are identical and the composition of the component (A) and the composition of the propylene polymer block (I) are identical, and when the component (B) contained in the propylene polymer composition is the hydrogenated conjugated diene polymer, the elastomer block (II) is the hydrogenated conjugated diene polymer block, the composition of the hydrogenated conjugated diene polymer and the composition of the hydrogenated conjugated diene polymer block are identical and the composition of the component (A) and the composition of the propylene polymer block (I) are identical.

$$y = z \times \{(SCB_{IS} - SCB_{PP})/(SCB_{EL} - SCB_{PP})\} \times \{(Mn_{PP} + Mn_{EL})/Mn_{EL}\} \quad (4)$$

z represents the content (% by weight) of CXIS or CHIS contained in the propylene polymer composition, the weight of the propylene polymer composition being 100% by weight.

$SCB_{IS}$ represents the number of short chain branches other than a methyl group contained in CXIS or CHIS, the number of carbon atoms of CXIS or CHIS being 1000.

$SCB_{PP}$ represents the number of short chain branches other than a methyl group contained in the propylene polymer block (I), with respect to the total number of carbon atoms of the propylene polymer block (I) being 1000.

$SCB_{EL}$ represents the number of short chain branches other than a methyl group contained in the elastomer block (II), with respect to the total number of carbon atoms of the elastomer block (II) being 1000.

$Mn_{PP}$ represents the number-average molecular weight of the propylene polymer block (I).

$Mn_{EL}$ represents the number-average molecular weight of the elastomer block (II) of the component (C).

The ratio of the polystyrene-equivalent weight-average molecular weight of the propylene polymer composition to the polystyrene-equivalent number-average molecular weight of the propylene polymer composition is preferably 1.5 or more and 3.0 or less.

The propylene polymer composition may contain a known additive, if necessary.

The additive includes a lubricant, a neutralizing agent, an adsorbent, an antioxidant, a nucleating agent, an ultraviolet absorber, an antistatic agent, an anti-blocking agent, a processing aid, an organic peroxide, a coloring agent (inorganic pigment, organic pigment, and pigment dispersant), a plasticizer, a flame retardant, an antibacterial agent and a light diffusion agent. These additives may be contained each singly or two or more of them may be contained. When the propylene polymer composition contains the additives, the content of each additive is usually 0.01 to 5% by weight when the total weight of the propylene polymer composition is 100% by weight.

<Process for Producing Propylene Polymer Composition>

The process for producing the propylene polymer composition comprises a step of mixing an end-functionalized propylene polymer with an end-functionalized elastomer to react some of them (hereinafter, referred to as "coupling reaction step" in some cases).

[End-Functionalized Propylene Polymer]

The end-functionalized propylene polymer is a propylene polymer in which a hydrogen atom at least at one end of a propylene polymer having a structural unit derived from propylene in an amount of 90% by weight or more when the total weight of the propylene polymer is 100% by weight is substituted with a functional group other than an alkyl group.

The end-functionalized propylene polymer includes a propylene polymer of which end is modified by acid.

The propylene polymer of which end is modified by acid includes a propylene polymer of which end is modified by maleic anhydride.

The propylene polymer of which end is modified by acid can be obtained by modifying a propylene polymer having a double bond at the end with an α,β-unsaturated carboxylic acid or its anhydride.

The preferable melting point, Mn, and Mw/Mn of the end-functionalized propylene polymer is the same as the preferable ones of the component (A).

[Propylene Polymer Having Double Bond at the End]

The process for the propylene polymer having a double bond at the end includes a method of polymerizing propylene in the presence of a metallocene catalyst and in the absence of hydrogen or in the presence of a very small amount of hydrogen or a method of molecule-cleaving a high molecular weight propylene polymer in the presence of an organic peroxide. The propylene polymer can be produced by methods described in JP-A No. 2001-525461 and JP-A No. 2009-299045. The range of the average amount of end double bond per molecular chain of propylene polymer having a double bond at the end which is suitable as the raw material of the end-functionalized propylene polymer is 0.1 or more and 2.0 or less, preferably 0.3 or more and 1.8 or less, more preferably 0.5 or more and 1.5 or less, still more preferably 0.7 or more and 1.2 or less. The average amount of end double bond can be controlled by adjusting the polymerization conditions such as the kind of a catalyst, the polymerization temperature, and the monomer concentration. The average amount of end double bond is preferably 0.1 or more from the standpoint of impact resistance of the molded body and is preferably 2.0 or less from the standpoint of mechanical properties and appearance of the molded body.

[Production Method of End-Functionalized Propylene Polymer]

The process for the end-functionalized propylene polymer include a method comprising a step of mixing a propylene polymer having a double bond at the end and an α,β-unsaturated carboxylic acid or its anhydride with heating in the presence or absence of a solvent.

Specific examples of the α,β-unsaturated carboxylic acid or its anhydride include maleic acid, fumaric acid, itaconic acid, and anhydrides thereof, and preferable are maleic acid and maleic anhydride. In the step, an acid catalyst such as Brønsted acids, and Lewis acids may be added for promoting the reaction of the propylene polymer having a double bond at the end with the α,β-unsaturated carboxylic acid or its anhydride.

[End-Functionalized Elastomer]

The end-functionalized elastomer is an elastomer in which a hydrogen atom at least at one end of at least one polymer selected from the group consisting of an ethylene-α-olefin copolymer having a structural unit derived from ethylene and a structural unit derived from an α-olefin having 3 to 10 carbon atoms and a hydrogenated conjugated diene polymer is substituted with a functional group other than an alkyl group. The preferable end functional group includes a hydroxyl group, a primary amino group, a secondary amino group, and a tertiary amino group.

The end-functionalized elastomer includes an ethylene-α-olefin copolymer of which end is modified by a hydroxyl group or an amino group, and a hydrogenated conjugated diene polymer of which end is modified by a hydroxyl group or an amino group.

The preferable kind of the structural unit derived from an α-olefin having 3 to 10, Mn, the number of short chain branches and Mw/Mn of end-functionalized elastomer is the same as the preferable ones of the component (B).

[End Hydroxyl Group Modified Ethylene-α-Olefin Copolymer]

The process for producing the end hydroxyl group modified ethylene-α-olefin copolymer includes the following methods.

(Method 1) A process comprising a step of reacting an ethylene-α-olefin copolymer having a double bond at the end with a compound containing a group 13 element, to obtain an ethylene-α-olefin copolymer having a functional group containing a group 13 element at the end, and a step of oxidizing the ethylene-α-olefin copolymer having a functional group containing a group 13 element at the end with an oxidizer, to obtain an end hydroxyl group modified ethylene-α-olefin copolymer.

(Method 2) A process comprising a step of reacting an ethylene-α-olefin copolymer having a carboxyl group or a carboxylic anhydride group at the end (hereinafter, referred to as "ethylene-α-olefin copolymer of which end is modified by acid") with a compound having two or more hydroxyl groups or a compound having a hydroxyl group and an amino group.

Hereinafter, the compound having two or more hydroxyl groups and the compound having a hydroxyl group and an amino group are collectively called "linker agent (F)" in some cases.

[Ethylene-α-Olefin Copolymer Having Double Bond at the End]

The ethylene-α-olefin copolymer having a double bond at the end is produced by a method of polymerizing ethylene and an α-olefin in the presence of an olefin polymerization catalyst for chain-transfer reaction, to obtain the copolymer or a method of molecule-cleaving a high molecular weight ethylene-α-olefin copolymer in the presence of an organic peroxide, to obtain the copolymer. The range of the average amount of end double bond per molecular chain of an ethylene-α-olefin copolymer having a double bond at the end which is suitable as the raw material of the end-functionalized ethylene-α-olefin copolymer is preferably 0.1 or more and 2.0 or less, more preferably 0.3 or more and 1.8 or less, still more preferably 0.5 or more and 1.5 or less, still more preferably 0.7 or more and 1.2 or less. The average amount of end double bond per molecular chain is preferably 0.1 or more, from the standpoint of increasing the content of the component (C) contained in the propylene polymer composition. The average amount of end double bond per molecular chain is preferably 2.0 or less, from the standpoint of suppression of generation of gel in the resultant propylene polymer composition.

[Compound Containing Group 13 Element]

The compound containing a group 13 element includes aluminum hydride compounds such as diisobutyl aluminum hydride, boron hydride compounds such as borane, and 9-borabicyclo[3.3.1]nonane. The oxidizer includes molecular oxygen, and hydrogen peroxide to oxidize the ethylene-α-olefin copolymer having a functional group including boron which is obtained with the compound containing a group 13 element.

[Ethylene-α-Olefin Copolymer of which End is Modified by Acid]

The ethylene-α-olefin copolymer of which end is modified by acid can be obtained by modifying an ethylene-α-olefin copolymer having a double bond at the end with an α,β-unsaturated carboxylic acid or its anhydride.

The process for producing the ethylene-α-olefin copolymer of which end is modified by acid include a process comprising a step of mixing an ethylene-α-olefin copolymer having a double bond at the end with an α,β-unsaturated carboxylic acid or its anhydride with heating in the presence or absence of a solvent.

Specific examples of the α,β-unsaturated carboxylic acid or its anhydride include maleic acid, fumaric acid, itaconic acid, and anhydrides thereof, and preferable are maleic acid and maleic anhydride. In the step, an acid catalyst such as Brønsted acids, and Lewis acids may be added for promoting the reaction of an ethylene-α-olefin copolymer having a double bond at the end with an α,β-unsaturated carboxylic acid or its anhydride.

[Linker Agent (F)]

As the linker agent (F), compounds having a hydroxyl group and an amino group are preferable.

The linker agent (F) includes 2-aminoethanol, 3-aminopropan-1-ol, 1-aminopropan-2-ol, 4-aminobutan-1-ol, 1-aminobutan-2-ol, 6-aminohexan-1-ol, 8-aminooctan-1-ol, 10-aminodecan-1-ol, 12-diaminododecan-1-ol, ethylene glycol, propylene glycol, 1,3-propanediol, 1,4-butanediol, 1,6-hexanediol, 1,8-octanediol, 1,10-decanediol, 1,12-dodecanediol, neopentyl glycol, and cyclohexanedimethanol, and preferable are 2-aminoethanol, 3-aminopropan-1-ol, 4-aminobutan-1-ol and 6-aminohexan-1-ol.

In the Method 2, the step of reacting an ethylene-α-olefin copolymer of which end is modified by acid with the linker agent (F) can be carried out in the presence or absence of a solvent.

The use amount of a linker agent (F) is usually 1 equivalent to 1000 equivalents, preferably 2 equivalents to 500 equivalents, more preferably 5 equivalents to 100 equivalents with respect to the functional group of the ethylene-α-olefin copolymer of which end is modified by acid. By using 2 equivalents or more of a linker agent (F), the reaction time can be shortened.

The solvent used in the Method 2 includes hydrocarbon solvents such as hexane, heptane, octane, decane, dodecane, cyclohexane, methylcyclohexane, and decalin, aromatic hydrocarbon solvents such as toluene, xylene, ethylbenzene, cumene, cymene, mesitylene, and tetralin, halogenated hydrocarbon solvents such as dichloromethane, chloroform, dichloroethane, trichloroethane, tetrachloroethane, chlorobutane, chlorobenzene, dichlorobenzene, and trichlorobenzene, ether solvents such as diethyl ether, tetrahydrofuran, tetrahydropyran, dioxane, ethylene glycol dimethyl ether, diethylene glycol dimethyl ether, triethylene glycol dimethyl ether, and tetraethylene glycol dimethyl ether, aprotic polar solvents such as dimethylformamide, dimethylacetamide, N-methylpyrrolidone, N,N-dimethylimidazolidinone, dimethyl sulfoxide, and sulfolane, etc. When the linker agent (F) is liquid at the reaction temperature, the linker agent (F) may be used as a solvent. The use amount of such a solvent is usually 1 to 100-fold by weight with respect to the ethylene-α-olefin copolymer of which end is modified by acid.

As one embodiment of the step of reacting an ethylene-α-olefin copolymer of which end is modified by acid with a linker agent (F) in the Method 2, a step of melt-kneading an ethylene-α-olefin copolymer of which end is modified by acid with the linker agent (F) using a melt kneading apparatus and reacting them is mentioned.

Such a melt kneading apparatus includes continuous kneading apparatuses such as a single screw extruder, and a twin screw extruder, batch mode kneaders such as a Bunbury mixer, a Laboplasto-mill and the like, and heated rolls.

The reaction temperature is usually 0° C. or more and 300° C. or less, preferably 10° C. or more and 280° C. or less, more preferably 20° C. or more and 250° C. or less.

For promoting the reaction of an ethylene-α-olefin copolymer of which end is modified by acid with the linker agent (F), a dehydration condensing agent may be added Brønsted acid catalysts such as sulfuric acid, methanesulfonic acid, and p-toluenesulfonic acid; Lewis acid catalysts such as aluminum chloride, tin chloride, iron chloride, titanium tetraisopropoxide, and dibutyltin laurate; amines such as triethylamine, tributylamine, pyridine, and diazabicycloundecene; and dicyclohexylcarbodiimide.

The reaction time is usually several seconds to 24 hours. After the reaction, the resultant end hydroxyl group modified ethylene-α-olefin copolymer can be purified with known purification methods such as solvent-extraction, and reprecipitation.

[Ethylene-α-Olefin Copolymer of which End is Modified by an Amino Group]

A process for producing the end amino group modified ethylene-α-olefin copolymer includes a process comprising a step of reacting an ethylene-α-olefin copolymer of which end is modified by acid with a compound having two amino groups (hereinafter, referred to as "linker agent (G)" in some cases).

[Linker Agent (G)]

The linker agent (G) includes ethylenediamine, 1,2-diaminopropane, 1,3-diaminopropane, 1,4-diaminobutane, 1,6-diaminohexane, 1,8-diaminooctane, 1,10-diaminodecane, 1,12-diaminododecane, m-xylylenediamine, p-xylylenediamine, isophoronediamine, 1,3-phenylenediamine, and 1,4-phenylenediamine.

The step of reacting an ethylene-α-olefin copolymer of which end is modified by acid with a linker agent (G) can be carried out in the presence or absence of a solvent.

The use amount of the linker agent (G) is usually 1 equivalent to 1000 equivalents, preferably 2 equivalents to 500 equivalents, more preferably 5 equivalents to 100 equivalents, with respect to the functional group of the ethylene-α-olefin copolymer of which end is modified by acid. By using 2 equivalents or more of the linker agent (G), the reaction time can be shortened.

The solvent to be used includes hydrocarbon solvents such as hexane, heptane, octane, decane, dodecane, cyclohexane, methylcyclohexane, and decalin, aromatic hydrocarbon solvents such as toluene, xylene, ethylbenzene, cumene, cymene, mesitylene, and tetralin, halogenated hydrocarbon solvents such as dichloromethane, chloroform, dichloroethane, trichloroethane, tetrachloroethane, chlorobutane, chlorobenzene, dichlorobenzene, and trichlorobenzene, ether solvents such as diethyl ether, tetrahydrofuran, tetrahydropyran, dioxane, ethylene glycol dimethyl ether, diethylene glycol dimethyl ether, triethylene glycol dimethyl ether, and tetraethylene glycol dimethyl ether, aprotic polar solvents such as dimethylformamide, dimethylacetamide, N-methylpyrrolidone, N,N-dimethylimidazolidinone, dimethyl sulfoxide, and sulfolane. When the linker agent (G) is liquid at the reaction temperature, the linker agent (G) may be used as a solvent. The use amount of such a solvent is usually 1 to 100-fold by weight with respect to the ethylene-α-olefin copolymer of which end is modified by acid.

As one embodiment of the step of reacting an ethylene-α-olefin copolymer of which end is modified by acid with a linker agent (G), a step of melt kneading an ethylene-α-olefin copolymer of which end is modified by acid and a linker agent (G) using a melt kneading apparatus and reacting them is mentioned.

Such a melt kneading apparatus includes continuous kneading apparatuses such as a single screw extruder, and a twin screw extruder, batch mode kneaders such as a Bunbury mixer, a Laboplasto-mill and the like, and heated rolls.

The reaction time is usually 0° C. or more and 300° C. or less, preferably 10° C. or more and 280° C. or less, more preferably 20° C. or more and 250° C. or less.

For promoting the reaction of an ethylene-α-olefin copolymer of which end is modified by acid with a linker agent (G), a dehydration condensing agent may be added such as Brønsted acid catalysts such as sulfuric acid, methanesulfonic acid, and p-toluenesulfonic acid, Lewis acid catalysts such as aluminum chloride, tin chloride, iron chloride, titanium tetraisopropoxide, and dibutyltin laurate, amines such as triethylamine, tributylamine, pyridine, and diazabicycloundecene, and dicyclohexylcarbodiimide.

The reaction time is usually several seconds to 24 hours. After the reaction, the resultant end amino group modified ethylene-α-olefin copolymer can be purified using known purification methods such as solvent-extraction, and reprecipitation.

[Process for Producing an End-Functionalized Hydrogenated Conjugated Diene Polymer]

The process for producing the end-functionalized hydrogenated conjugated diene polymer includes the following methods.

(Method 11) A process comprising
a step of hydrogenating a conjugated diene polymer, to obtain a hydrogenated conjugated diene polymer and
a step of modifying the end of the hydrogenated conjugated diene polymer, to obtain an end-functionalized hydrogenated conjugated diene polymer.

(Method 12) A process comprising
a step of synthesizing a conjugated diene polymer having a functional group, to obtain an end-functionalized conjugated diene polymer and
a step of hydrogenating the end-functionalized conjugated diene polymer, to obtain an end-functionalized hydrogenated conjugated diene polymer.

The preferable functional group includes a hydroxyl group, a primary amino group, a secondary amino group, and a tertiary amino group.

The hydrogenated conjugated diene type copolymer of which end is modified by an amino group can be obtained with a method described in JP-A No. Hei-7-331023.

The hydrogenated conjugated diene type polymer of which end is modified by an amino group having a primary amino group or a secondary amino group at the end can be obtained with methods described in Journal of Polymer Science: Polymer Chemistry Edition, 1977, Vol. 15, 2401, JP-A No. Hei-9-278677, JP-A No. Hei-11-71426, JP-A No. 2003-246817; a process comprising a step of polymerizing conjugated diene or conjugated diene with other monomer to obtain a conjugated diene copolymer, a step adding a polymerization terminator having amino group to the resultant conjugated diene polymer to obtain the conjugated diene type polymer of which end is modified by an amino group, and a step of hydrogenating the conjugated diene type polymer of which end is modified by an amino group to obtain the hydrogenated conjugated diene type polymer of which end is modified by an amino group. The polymerization terminator having amino group includes polymerization terminator described in High Molecular, 47, February 1998, 70-73 and Makromolecule Chemie, Rapid Communication, 3 59-62(1982).

[Coupling Reaction Step]

The coupling reaction step is a step of mixing an end-functionalized propylene polymer with an end-functionalized elastomer and reacting some of them, to obtain a propylene polymer composition containing the component (C) as the reaction product of the end-functionalized propylene polymer and the end-functionalized elastomer, an unreacted end-functionalized propylene polymer as the component (A) and an unreacted end-functionalized elastomer as the component (B).

The step of mixing an end-functionalized propylene polymer with an end-functionalized elastomer and reacting some of them can be conducted by dissolving or suspending an end-functionalized propylene polymer and an end-functionalized elastomer in a solvent and reacting them under heated or non-heated condition.

The ratio of the use amount of an end-functionalized elastomer to the use amount of an end-functionalized propylene polymer is 0.5 or more and 3.0 or less, preferably 0.7 or more and 2.5 or less, more preferably 0.8 or more and 2.0 or less, in terms of the equivalent ratio of respective functional groups. The unreacted end-functionalized elastomer can be removed by purification as described later.

The solvent used in the coupling reaction step includes hydrocarbon solvents such as hexane, heptane, octane, decane, dodecane, cyclohexane, methylcyclohexane, and decalin, aromatic hydrocarbon solvents such as toluene, xylene, ethylbenzene, cumene, cymene, mesitylene, and tetralin, halogenated hydrocarbon solvents such as dichloromethane, chloroform, dichloroethane, trichloroethane, tetrachloroethane, chlorobutane, chlorobenzene, dichlorobenzene, and trichlorobenzene, ether solvents such as diethyl ether, tetrahydrofuran, tetrahydropyran, dioxane, ethylene glycol dimethyl ether, diethylene glycol dimethyl ether, triethylene glycol dimethyl ether, and tetraethylene glycol dimethyl ether, aprotic polar solvents such as dimethylformamide, dimethylacetamide, N-methylpyrrolidone, N,N-dimethylimidazolidinone, dimethyl sulfoxide, and sulfolane. The use amount of such a solvent is usually 1 to 100-fold by weight with respect to the total amount of an end-functionalized propylene polymer and an end-functionalized elastomer used in the coupling reaction step.

The reaction temperature in the coupling reaction step is usually 0° C. or more and 300° C. or less, preferably 10° C. or more and 280° C. or less, more preferably 20° C. or more and 250° C. or less.

For promoting the reaction of an end-functionalized propylene polymer with an end-functionalized elastomer, a dehydration condensing agent may be added such as Brønsted acid catalysts such as sulfuric acid, methanesulfonic acid, and p-toluenesulfonic acid, Lewis acid catalysts such as aluminum chloride, tin chloride, iron chloride, titanium tetraisopropoxide, and dibutyltin laurate, amines such as triethylamine, tributylamine, pyridine, and diazabicycloundecene, and dicyclohexylcarbodiimide. The use amount is not particularly restricted.

For preventing degradation of a polymer in the coupling reaction step, a stabilizer such as an antioxidant may be used. One kind of the stabilizer may be used singly or two or more kinds of the stabilizers may be used in combination. The use amount of the stabilizer is usually 0.0001 to 0.01-fold by weight with respect to the total amount of an end-functionalized propylene polymer and an end-functionalized elastomer used in the coupling reaction step.

The reaction time is usually 10 minutes to 48 hours.

As one embodiment of the coupling reaction step, a step of melt kneading an end-functionalized propylene polymer with an end-functionalized elastomer using a melt kneading apparatus and reacting them is mentioned.

Such a melt kneading apparatus includes continuous kneading apparatuses such as a single screw extruder, and a twin screw extruder, batch mode kneaders such as a Bunbury mixer, and a Laboplasto-mill, and heated rolls.

The melt kneading temperature is preferably 150° C. or more and 300° C. or less, more preferably 160° C. or more and 280° C. or less, still more preferably 170° C. or more and 250° C. or less.

The melt kneading time is usually 10 seconds to 1 hour.

Other melt kneading conditions are the same as in the case of conducting the coupling reaction using a solvent.

After the coupling reaction step, a step of separating and removing an unreacted end-functionalized elastomer from the composition obtained in the coupling reaction step using a known purification method such as solvent-extraction, and reprecipitation.

The propylene polymer composition comprising the component (A), the component (B) and the component (C) can improve impact resistance and rigidity of a heterophasic propylene polymer.

<Material (D)>

The material (D) is a mixture having a structure in which a component (ii) is dispersed in a continuous phase of a component (i) having a structural unit derived from propylene in an amount of 90% by weight or more when the total weight of the propylene polymer is 100% by weight.

Component (ii): a copolymer having a structural unit derived from ethylene in an amount of more than 10% by weight and 99% by weight or less when the total weight of the ethylene-α-olefin copolymer is 100% by weight and a structural unit derived from an α-olefin.

Usually, the material (D) is a propylene polymer consisting the component (i) and the component (ii) obtained by multistage polymerization.

The propylene polymer composition may be subjected to purification such as extraction, and reprecipitation before mixing with a heterophasic propylene polymer. CXIS or CHIS and a heterophasic propylene polymer may be mixed to give a mixture.

[Component (i)]

The component (i) is a propylene polymer having a structural unit derived from propylene in an amount of 90% by weight or more when the total weight of the propylene polymer is 100% by weight.

The component (i) includes a propylene homopolymer, and a random copolymer having a structural unit derived from at least one olefin selected from the group consisting of ethylene and α-olefins having 4 to 10 carbon atoms and a structural unit derived from propylene.

The α-olefin having 4 to 10 carbon atoms includes 1-butene, 1-hexene, 4-methyl-1-pentene, 1-octene, and 1-decene. The random copolymer may contain only one kind of the structural unit derived from at least one olefin selected from the group consisting of ethylene and α-olefins having 4 to 10 carbon atoms or may contain two or more kinds of the structural units. The random copolymer is preferably an ethylene-propylene random copolymer.

From the standpoint of rigidity and heat resistance of the resultant molded body, the component (i) is preferably a propylene homopolymer.

The limiting viscosity [η] of the component (i) measured in tetralin at 135° C. is preferably 0.1 to 5 dl/g, more preferably 0.3 to 4 dl/g, still more preferably 0.5 to 3 dl/g. From the standpoint of impact resistance and toughness of the resultant molded body, [η] of the component (i) is preferably 0.1 dl/g or more. From the standpoint of moldability, [I] of the component (i) is preferably 5 dl/g or less.

The isotactic pentad fraction [mmmm] of the component (i) is preferably 0.95 or more, more preferably 0.97 or more, still more preferably 0.98 or more, from the standpoint of rigidity and heat resistance of the resultant molded body.

[Component (ii)]

The component (ii) is a copolymer having a structural unit derived from ethylene in an amount of more than 10% by weight and 99% by weight or less when the total weight of the ethylene-α-olefin copolymer is 100% by weight and a structural unit derived from an α-olefin. The component (ii) is a random copolymer.

The α-olefin having 3 to 10 carbon atoms includes propylene, 1-butene, 1-hexene, 4-methyl-1-pentene, 1-octene, and 1-decene. The structural unit derived from an α-olefin in the component (ii) is preferably a structural unit derived from propylene, a structural unit derived from 1-butene, a structural unit derived from 1-hexene or a structural unit derived from 1-octene, more preferably a structural unit derived from propylene or a structural unit derived from 1-butene. The ethylene-α-olefin copolymer may contain only one kind of the structural unit derived from an α-olefin having 3 to 10 carbon atoms or may contain two or more kinds of the structural units.

The component (ii) is preferably an ethylene-propylene copolymer.

From the standpoint of impact resistance of the resultant molded body, the content of a structural unit derived from ethylene contained in the component (ii) is preferably more than 10% by weight and 90% by weight or less, more preferably 15% by weight or more and 80% by weight or less, still more preferably 20% by weight or more and 75% by weight or less.

The melt flow rate (hereinafter, referred to as "MFR") of the material (D) measured under conditions of a temperature of 230° C. and a load of 21.18 N is preferably 2 to 150 g/10 min, more preferably 15 to 130 g/10 min. The MFR is a value measured under conditions of a temperature of 230° C. and a load of 21.18 N according to a method prescribed in JIS K7210.

From the standpoint of molding processability, MFR of the material (D) is preferably 2 g/10 min or more. From the standpoint of impact resistance and toughness of the resultant molded body, MFR of the material (D) is preferably 150 g/10 min or less.

The content of the component (ii) contained in the material (D) is preferably 1 to 49% by weight, more preferably 5 to 45% by weight, still more preferably 10 to 40% by weight when the total weight of the material (D) is 100% by weight. The content of the component (i) contained in the material (D) is preferably 51 to 49% by weight, more preferably 5 to 45% by weight, still more preferably 10 to 40% by weight when the total weight of the material (D) is 100% by weight.

A process for the material (D) includes a process comprising a step of polymerizing propylene in the presence of a propylene polymerization catalyst to obtain a component (i) and a step of copolymerizing propylene or an α-olefin having 4 to 10 carbon atoms and ethylene in the presence of the component (i) to obtain a material (D). This method is generally called "multistage polymerization method".

The propylene polymerization catalyst includes a Ziegler catalyst system, a Ziegler Natta catalyst system, a catalyst system consisting a compound of an aluminoxane and a transition metal belonging to group 4 of the periodic table having a cyclopentadienyl ring, a catalyst system consisting a compound of a transition metal belonging to group 4 of the periodic table having a cyclopentadienyl ring, a compound reacting therewith to form an ionic complex and an organoaluminum compound.

These catalyst systems include catalyst systems described in JP-A No. Sho-61-218606, JP-A No. Sho-61-287904, JP-A No. Hei-5-194685, JP-A No. Hei-7-216017, JP-A No. Hei-9-316147, JP-A No. Hei-10-212319, JP-A No. 2004-182981, JP-A No. 2009-173870, and JP-A No. 2013-147602.

Further, a prepolymerization catalyst prepared by prepolymerizing ethylene and an α-olefin in the presence of the catalyst system may be used.

The polymerization method includes bulk polymerization, solution polymerization, slurry polymerization, and gas phase polymerization. Bulk polymerization is a method of conducting polymerization using as a medium an olefin which is liquid at the polymerization temperature, and both solution polymerization and slurry polymerization are methods of conducting polymerization in an inactive hydrocarbon solvent such as propane, butane, isobutane, pentane, hexane, heptane, and octane, and gas phase polymerization is a method in which a monomer in gaseous state is used as a medium and a monomer in gaseous state is polymerized in the medium. These polymerization methods may be any of batch mode or continuous mode, and these polymerization methods may be combined arbitrarily. From the industrial and economical standpoint, production methods by a continuous mode gas phase polymerization method or a bulk-gas phase polymerization method of conducting a bulk polymerization method and a gas phase polymerization method in a continuous manner are preferable.

Various conditions such as polymerization temperature, polymerization pressure, monomer concentration, catalyst input, and polymerization time in the polymerization step may be determined appropriately.

<Mixture>

The material (D) and the propylene polymer composition may be mixed to obtain a mixture. The mixture of the propylene polymer composition and the material (D) comprising the component (i) and the component (ii) is preferably a mixture in which at least one of the content of CXIS and the content of CHIS in the polymer components contained in the mixture is 50 to 95% by weight when the total weight of the polymer components contained in the mixture is 100% by weight.

At least one of the content of CXIS and CHIS in the polymer components of the mixture can be 50% by weight to 95% by weight when the total of the content of the component (ii) in the material (D) and the content of the component (B) is 5% by weight to 50% by weight.

In a mixture of the material (D) and the propylene polymer composition, the propylene polymer composition is used in an amount of usually 0.1 to 10% by weight, preferably 0.2 to 5% by weight, more preferably 0.3 to 3% by weight when the total amount of the mixture is 100% by weight. From the standpoint of impact resistance of the molded body comprising the mixture, the use amount of the propylene polymer composition is preferably 0.1% by weight or more.

The mixture of the material (D) and the propylene polymer composition may further contain the following propylene polymer, elastomer or both.

The propylene polymer which may be further contained includes a propylene homopolymer, and a propylene-α-olefin random copolymer having a structural unit derived from at least one α-olefin selected from the group consisting of ethylene and α-olefins having 4 to 10 carbon atoms and a structural unit derived from propylene.

The α-olefin having 4 to 10 carbon atoms includes 1-butene, 1-hexene, 4-methyl-1-pentene, 1-octene and 1-decene. The propylene-α-olefin random copolymer is preferably a propylene-ethylene random copolymer. The content of a structural unit derived from propylene contained in the propylene-α-olefin random copolymer is preferably 90% by weight or more, more preferably 95% by weight or more when the total weight of the propylene-α-olefin random copolymer is 100% by weight, from the standpoint of rigidity and heat resistance of the resultant molded body.

The mixture containing the material (D) and the propylene polymer composition may further contain a propylene homopolymer.

The limiting viscosity [η] measured in tetralin at 135° C. of the propylene polymer which may be further contained is preferably 0.1 to 5 dl/g, more preferably 0.5 to 3 dl/g, still more preferably 0.7 to 2 dl/g.

As the elastomer which may be further contained, at least one elastomer selected from the group consisting of olefinic elastomers and vinyl aromatic compound elastomers is mentioned.

The olefinic elastomer is a copolymer having a structural unit derived from ethylene and a structural unit derived from an α-olefin having 4 or more and 20 or less carbon atoms. The content of a structural unit derived from ethylene in the olefinic elastomer is preferably 50% by weight or more when the sum of the content of a structural unit derived from ethylene and the content of a structural unit derived from an α-olefin having 4 or more and 20 or less carbon atoms is 100% by weight.

The α-olefin having 4 or more and 20 or less carbon atoms includes 1-butene, isobutene, 1-pentene, 2-methyl-1-butene, 3-methyl-1-butene, 1-hexene, 2-methyl-1-pentene, 3-methyl-1-pentene, 4-methyl-1-pentene, 1-octene, 1-nonene, 1-decene, 1-undecene, and 1-dodecene. These may be used each singly or two or more of them may be used in combination. Preferable is 1-butene, 1-hexene or 1-octene.

The density of the olefinic elastomer measured according to JIS K7112 is 0.85 g/cm$^3$ or more and 0.885 g/cm$^3$ or less, preferably 0.85 g/cm$^3$ or more and 0.88 g/cm$^3$ or less, more preferably 0.855 g/cm$^3$ or more and 0.875 g/cm$^3$ or less, from the standpoint of impact resistance of the molded body comprising the mixture.

The melt flow rate of the olefinic elastomer measured under conditions of a temperature of 190° C. and a load of 21.18 N is 0.05 to 200 g/10 min, preferably 0.1 to 150 g/10 min, more preferably 0.2 to 100 g/10 min, still more preferably 0.3 to 80 g/10 min, from the standpoint of impact resistance of the molded body comprising the mixture.

A process for the olefinic elastomer includes a process for using a polymerization catalyst. The polymerization catalyst includes Ziegler Natta catalysts composed of a vanadium compound, an organoaluminum compound and a halogenated ester compound, catalysts combining alumoxane or a boron compound with a metallocene compound in which at least one group having a cyclopentadienyl anion skeleton is coordinated to a titanium atom, a zirconium atom or a hafnium atom, and metallocene catalysts.

The polymerization method includes a method of copolymerizing ethylene and an α-olefin in an inactive organic solvent such as a hydrocarbon compound, a method of copolymerizing ethylene and an α-olefin without using a solvent.

Further, commercially available corresponding products may be used. The commercially available corresponding products include Engage (registered trademark) series manufactured by The Dow Chemical Company, and TAFMER (registered trademark) series manufactured by Mitsui Chemicals, Inc.

The vinyl aromatic compound elastomer is an elastomer obtained by polymerizing a vinyl aromatic compound. The vinyl aromatic compound elastomer includes a block polymer having a structural unit derived from a vinyl aromatic compound and a structural unit derived from a conjugated diene, or a block polymer obtained by hydrogenating a double bond at the conjugated diene part of the block copolymer. As the vinyl aromatic compound elastomer, a block polymer obtained by hydrogenating a double bond at the conjugated diene part of a block copolymer having a structural unit derived from a vinyl aromatic compound and a structural unit derived from a conjugated diene is preferable, a block polymer obtained by hydrogenating 80% or more of a double bond at the conjugated diene part of a block copolymer is more preferable, and a block polymer in which 85% or more of the double bond is hydrogenated is still more preferably used. These may be used each singly or two or more of them may be used in combination.

The vinyl aromatic compound in the vinyl aromatic compound elastomer includes styrene. The block polymer containing a structural unit derived from a vinyl aromatic compound and a structural unit derived from a conjugated diene includes styrene-ethylene-butene-styrene elastomer (SEBS), styrene-ethylene-propylene-styrene elastomer (SEPS), styrene-butadiene elastomer (SBR), styrene-butadiene-styrene elastomer (SBS), and styrene-isoprene-styrene elastomer (SIS).

The content of a structural unit derived from a vinyl aromatic compound in the vinyl aromatic compound elastomer is preferably 10% by weight or more and 70% by weight or less, more preferably 11% by weight or more and 50% by weight or less, still more preferably 12% by weight or more and 30% by weight or less when the total amount of the vinyl aromatic compound elastomer is 100% by weight.

The density of the vinyl aromatic compound elastomer measured according to JIS K7112 is 0.88 g/cm$^3$ or more and 0.99 g/cm$^3$ or less, preferably 0.88 g/cm$^3$ or more and 0.94 g/cm$^3$ or less, more preferably 0.89 g/cm$^3$ or more and 0.91 g/cm$^3$ or less, from the standpoint of impact resistance of the molded body comprising the mixture.

The melt flow rate measured under conditions of a temperature of 230° C. and a load of 21.18 N of the vinyl aromatic compound elastomer measured according to JIS K6758 is preferably 0.1 g/10 min or more and 15 g/10 min or less, more preferably 1 g/10 min or more and 13 g/10 min or less. As the molecular weight distribution of the vinyl aromatic compound elastomer, the molecular weight distribution (Mw/Mn) determined from the weight-average molecular weight (Mw) and the number-average molecular weight (Mn) measured by a gel permeation chromatography (GPC) method is preferably 2.5 or less, more preferably 2.3 or less.

A process for producing the vinyl aromatic compound elastomer includes a process for polymerizing a conjugated diene and a vinyl aromatic compound, and if necessary, an olefin, in a hydrocarbon solvent.

Further, commercially available corresponding products may be used. The commercially available corresponding products include Kraton (registered trademark) series manufactured by Kraton Corporation, SEPTON (registered trademark) manufactured by Kuraray Co., Ltd., DYNARON (registered trademark) manufactured by JSR, and Tuftec (registered trademark) manufactured by Aasahi Kasei Corporation.

When the mixture further contains an elastomer, the content of the elastomer is preferably 1 to 40% by weight, more preferably 3 to 30% by weight, still more preferably 5 to 25% by weight when the total amount of the mixture is 100% by weight. The mixture may contain only one kind of the elastomer or may contain two or more kinds of the elastomers.

In the case of a mixture containing the material (D), the propylene polymer composition and the elastomer, the sum of the content of the component (ii) in the material (D), the content of the component (B) in the propylene polymer composition, the content of the elastomer block (II) and the content of the elastomer is preferably 5 to 50% by weight, more preferably 5 to 45% by weight, still more preferably 10 to 40% by weight, still more preferably 15 to 35% by weight when the total weight of the mixture is 100% by weight, from the standpoint of rigidity, heat resistance and impact resistance.

<Inorganic Filler>

The mixture of the material (D) and the propylene polymer composition may further contain an inorganic filler.

The shape of the inorganic filler includes powder, flake, granule and fiber.

The inorganic filler having a shape of powder, flake and granule includes, specifically, talc, mica, calcium carbonate, barium sulfate, magnesium carbonate, clay, alumina, silica, calcium sulfate, silica sand, carbon black, titanium oxide, magnesium hydroxide, zeolite, molybdenum, diatomaceous earth, sericite, volcanic soil, calcium hydroxide, calcium sulfite, sodium sulfate, bentonite, and graphite.

The inorganic filler having a shape of fiber includes, specifically, fibrous magnesium oxysulfate, potassium titanate fiber, magnesium hydroxide fiber, aluminum borate fiber, calcium silicate fiber, calcium carbonate fiber, carbon fiber, glass fiber, and metal fiber.

The mixture may contain only one kind of the inorganic filler or may contain two or more kinds of the inorganic fillers.

The inorganic filler is preferably talc or fibrous magnesium oxysulfate.

The content of the inorganic filler in the mixture containing the material (D), the propylene polymer composition and the inorganic filler is preferably 1 to 40% by weight, more preferably 2 to 35% by weight, still more preferably 5 to 30% by weight when the total weight of the mixture is 100% by weight.

MFR measured under conditions of a temperature of 230° C. and a load of 21.18 N of the mixture containing the material (D) and the propylene polymer composition is preferably 1 to 200 g/10 min, more preferably 2 to 150 g/10 min, still more preferably 5 to 100 g/10 min, still more preferably 10 to 70 g/10 min, from the standpoint of molding processability and impact resistance.

A process for producing the mixture is preferable that the process comprises a step of feeding the propylene polymer composition and the material (D), and if necessary, the elastomer, and the inorganic filler, to a melt kneading apparatus and a step of melt kneading the propylene polymer composition and the material (D), by the melt kneading apparatus.

The melt kneading apparatus used for melt kneading includes a single screw extruder, a twin screw extruder, a Bunbury mixer, and heated rolls. The temperature of melt kneading is preferably 170 to 250° C., and the heat treatment time is preferably 10 seconds to 20 minutes. The melt kneading steps of the components may be conducted simultaneously or conducted in split. Prescribed amounts of the components in the mixture may be weighed, and premixed uniformly in a tumbler, then, the pre-mixture may be melt kneaded, or the components may be fed directly by a feeder and meld-kneaded.

The mixture may be molded to give a molded body. The application of the molded body includes automobile parts such as automobile interior parts and exterior parts, two wheel vehicle parts, food packages, and parts of furniture and electrical products. The molded body can be used suitably for automobile parts and food packages, and can be used more suitably for automobile parts. The automobile exterior parts include bumper, fender, and wheel cover, the automobile interior parts include instrumental panel, trim, door panel, side protector, console box, and column cover, and the two wheel vehicle parts include cowling, and muffler cover.

EXAMPLES

<Average Molecular Weight [Unit: None] and Molecular Weight Distribution [Unit: None]>

The polystyrene-equivalent weight-average molecular weight (Mw) and the polystyrene-equivalent number-average molecular weight (Mn) were measured by gel permeation chromatography (GPC) under the following conditions. The molecular weight distribution (Mw/Mn) was determined as the ratio of Mw to Mn.

GPC apparatus: type 150C manufactured by Millipore-waters
column: TSK-GEL GMH-HT 7.5×600×2 columns
measurement temperature: 140° C., 152° C.
solvent: orthodichlorobenzene
measurement concentration: 5 mg/5 mL <Glass Transition Temperature (Tg) [Unit: ° C.], Crystallization Temperature (Tc) [Unit: ° C.], Melting Temperature (Tm) [Unit: ° C.] and Melting Heat Quantity (ΔH) [Unit: J/g]>

An aluminum pan containing about 5 mg of an enclosed sample was (1) kept at 220° C. for 5 minutes, then (2) cooled at a rate of 10° C./min from 220° C. to −90° C., then (3) heated at a rate of 10° C./min form −90° C. to 220° C., then (4) cooled at a rate of 10° C./min from 220° C. to −90° C., then (5) kept at −90° C. for 5 minutes and (6) heated at a rate of 2° C./min from −90° C. to 60° C. (modulation amplitude: ±0.16° C., modulation period: 30 seconds), under a nitrogen atmosphere, with a heat analysis instrument, differential scanning calorimeter (Q100 manufactured by TA Instruments).

The differential scanning calorimetry curve obtained by calorimetry in the step (2) was analyzed by a method according to JIS K7121-1987 to obtain crystallization peaks. The top temperature of the resulting crystallization peaks was adopted as the crystallization temperature.

The differential scanning calorimetry curve obtained by calorimetry in the step (3) was analyzed by a method according to JIS K7121-1987 to obtain melting peaks. The top temperature of the resulting melting peaks was adopted as the melting point.

The differential scanning calorimetry curve obtained by calorimetry in the step (3) was analyzed by a method according to JIS K7122-1987 to obtain melting heat. The resultant melting heat was adopted as the melting heat quantity.

The differential scanning calorimetry curve obtained by calorimetry in the step (6) was analyzed by a method according to JIS K7121-1987 to obtain glass transition temperature of intermediate point. The resultant intermediate point glass transition temperature was adopted as the glass transition temperature.

<Content (Unit: % by Weight) of Structural Unit Derived from Ethylene Contained in Ethylene-Propylene Copolymer, Content (Unit: % by Weight) of Structural Unit Derived from Ethylene Contained in Propylene Polymer Composition, Content (Unit: % by Weight) of Ethylene-Propylene Copolymer Contained in Propylene Polymer Composition, Content (Unit: % by Weight) of Structural Unit Derived from Ethylene Contained in Material (D), Content (Unit: % by Weight) of Component (ii) Contained in Material (D)>

Carbon nuclear magnetic resonance spectrum ($^{13}$C-NMR spectrum) was measured with a nuclear magnetic resonance spectroscope (NMR) under measurement conditions shown below. The $^{13}$C-NMR spectrum was analyzed according to the method described in the report of Kakugo, et al. (reference literature: Macromolecules, 1982, No. 15, pp. 1150 to 1152), and the contents of each structural unit and each polymer were determined.

Apparatus: AVANCE600 manufactured by Bruker, 10 mm cryoprobe
measurement temperature: 130° C.
measurement method: proton decoupling method
pulse width: 45 degree
pulse repeating time: 4 seconds
chemical shift value standard: tetramethylsilane <Number of Short Chain Branch Other than Methyl Group Contained in Hydrogenated Polybutadiene or Propylene Polymer Composition (Unit: Number/1000 C)>

In the measured $^{13}$C-NMR spectrum, the sum of integrated intensities of all peaks observed in 10 to 15 ppm was adopted as the number of short chain branches other than a methyl group when the sum of the integrated intensities of all peaks observed in 5 to 50 ppm was 1000.

The content of the elastomer block in the propylene polymer composition was calculated by the following calculation formula.

(content of elastomer block)=$(SCB_m)/(SCB_{EL})$ $SCB_m$: number of short chain branch other than methyl group contained in propylene polymer composition
$SCB_{EL}$: number of short chain branch other than methyl group contained in raw material of elastomer block or intermediate thereof <Isotactic Pentad Fraction ([Mmmm])>

The measured $^{13}$C-NMR spectrum of a polymer was analyzed according to the method described in the report of A. Zambelli, et al. (Macromolecules, 1973, No. 6, pp. 925 to 926), and [mmmm] was calculated.

<Introduction Amount of Succinic Anhydride Residue in the Polymer of which End was Modified by Maleic Acid (Unit: mmol/g)>

In the proton nuclear magnetic resonance spectrum ($^1$H-NMR spectrum), the integrated value of the signal of methine proton of the succinic anhydride portion generated by modification of the polymer end with maleic anhydride in the region of 3.15-3.25 ppm was compared with the integrated value of the signal of proton in the alkane region, and the content of the succinic anhydride residue in the polymer of which end was modified by maleic acid was calculated.

<Hydroxyl Group Content in Polymer (Unit: mmol/g)>

In the proton nuclear magnetic resonance spectrum ($^1$H-NMR spectrum), the integrated value of the signal of methine proton adjacent to a hydroxyl group in the region of 3.75-3.70 ppm was compared with the integrated value of the signal of proton in the alkane region, and the content of a hydroxyl group of the ethylene-propylene copolymer of which end was modified by a hydroxyl group was calculated.

<Content of Amino Group of Polymer (Unit: Mmol/g)>

The content of amino group of the ethylene-propylene copolymer of which end was modified by an amino group was calculated by comparing the integrated value of the signal of methine proton adjacent to an amino group in the region of 2.95-2.80 ppm with the integrated value of the signal of proton in the alkane region, in the $^1$H-NMR spectrum.

The content of amino group the hydrogenated polybutadiene of which end was modified by an amino group was calculated by comparing the integrated value of the signal of methine proton adjacent to an amino group in the region of 4.10-4.00 ppm with the integrated value of the signal of proton in the alkane region, in the $^1$H-NMR spectrum, when 4-(N,N-bis(trimethylsilyl)aminomethyl)phenyllithium was used as an initiator.

<Limiting Viscosity [Unit: Dl/g]>

The reduced viscosity was measured using an Ubbelohde type viscometer at three concentrations of 0.1, 0.2 and 0.5 g/dl using a tetralin solvent at a temperature of 135° C. Next, according to a calculation method described in "Polymer Solution, Polymer Experiment (Kobunshi Jikkengaku) 11" (published by Kyoritsu Shuppan Co., Ltd., 1982) p. 491, the reduced viscosity was plotted against the concentration, and the limiting viscosity was determined by an extrapolation method of extrapolating the concentration to zero.

<Limiting Viscosity: $[\eta]_i$ of Component (i) Contained in Material (D)>

For the limiting viscosity ($[\eta]_i$) of the component (i) contained in the material (D), the sample of component (i) was taken out from a polymerization tank after a step of obtaining the component (i) as the first step in producing the material (D), and the limiting viscosity was measured by the above-described method.

<Limiting Viscosity: $[\eta]_{ii}$ of Component (ii) Contained in Material (D)>

The limiting viscosity ($[\eta]_i$) of the component (i) and the limiting viscosity ($[\eta]_M$) of the whole material (D) were measured, respectively. The weight ratio (X) of the component (ii) to the whole material (D), $[\eta]_i$ and $[\eta]_M$ were substituted into the following formula, and the limiting viscosity ($[\eta]_{ii}$) of the ethylene-based copolymer contained in the material (D) was determined. (The weight ratio (X) of the component (ii) was determined by the above-described method.)

$$[\eta]_{ii}=[\eta]_M/X-(1/X-1)[\eta]_i$$

$[\eta]_i$: limiting viscosity of component (i) (dL/g)
$[\eta]_M$: limiting viscosity of whole material (D) (dL/g)

<Proportion of Component (C)>

The content y (% by weight) of the component (C) contained in the propylene polymer composition was determined as described below.

When the elastomer block (II) is an ethylene-propylene copolymer:

$$y=z*\{(C2_{IS}-C2_{PP})/(C2_{EP}-C2_{PP})\}*\{(Mn_{PP}+Mn_{EP})/Mn_{EP}\}$$

z (% by weight): content of CXIS or CHIS fraction in propylene polymer composition with respect to the total amount of the propylene polymer composition of 100% by weight.

$C2_{IS}$(% by weight): content of structural unit derived from ethylene in CXIS or CHIS with respect to the total amount of CXIS or CHIS of 100% by weight $C2_{PP}$ (% by weight): content of the fraction of structural unit derived from ethylene in propylene polymer block (I) with respect to the total amount of the propylene polymer block (I) of 100% by weight.

$C2_{EP}$ (% by weight): content of the fraction of structural unit derived from ethylene in ethylene-propylene copolymer block with respect to the total amount of the ethylene-propylene copolymer of 100% by weight.

$Mn_{PP}$: number-average molecular weight of propylene polymer block (I)

$Mn_{EP}$: number-average molecular weight of ethylene-propylene copolymer block When the elastomer block is an ethylene-α-olefin copolymer block having a structural unit derived from ethylene in an amount of more than 10% by weight and 99% by weight or less and a structural unit derived from an α-olefin having 4 to 10 carbon atoms, or is a hydrogenated conjugated diene block:

$$y=z*\{(SCB_{IS}-SCB_{PP})/(SCB_{EL}-SCB_{PP})\}*\{(Mn_{PP}+Mn_{EL})/Mn_{EL})\}$$

z (% by weight): the content of CXIS or CHIS fraction in the propylene polymer composition with respect to the total amount of the propylene polymer composition $SCB_{IS}$: number of short chain branch other than methyl group in CXIS or CHIS when the total number of carbon atom of CXIS or CHIS is 1000.

$SCB_{PP}$: number of short chain branch other than methyl group in the propylene polymer block (I) when the total number of carbon atom of the propylene polymer block (I) is 1000.

$SCB_{EL}$: number of short chain branch other than methyl group in elastomer block (II) when the total number of carbon atom of propylene polymer block (II) is 1000.

$Mn_{PP}$: number-average molecular weight of propylene polymer block (I)

$Mn_{EL}$: the number-average molecular weight of elastomer block (II)

<Melt Flow Rate (MFR, Unit: g/10 Min)>

MFR was measured according to a method prescribed in JIS K7210 under conditions of a test temperature of 230° C. and a test load of 21.18 N.

<Method of Molding Test Piece for Evaluation of Physical Property>

Injection molding was conducted using type SI-30III injection molding machine manufactured by TOYO Machinery & Metal Co., Ltd. at a molding temperature of 220° C. and a mold temperature of 50° C., to obtain a test piece for evaluation of physical properties having a thickness of 4 mm.

<Flexural Modulus (FM, Unit: MPa)>

Flexural modulus of the test piece for evaluation of physical properties was measured according to a method prescribed in JIS K7203 under conditions of a measurement temperature of 23° C. and a bending load rate of 2.0 mm/min.

<Izod Impact Strength (Iz, Unit: KJ/m$^2$)>

The test piece for evaluation of physical properties was notched, and Izod impact strength of the notched test piece was measured according to a method prescribed in JIS K7110 at a measurement temperature of 23° C.

<Heat Deflection Temperature (HDT, Unit: ° C.)>

Heat deflection temperature of the test piece for evaluation of physical properties was measured according to a method prescribed in JIS K7191 at a load of 0.45 MPa.

<Material (D)>

Materials (D)((D-1) to (D-3)) consisting of the component (i) and the component (ii) were synthesized using a Ziegler Natta catalyst. The structures of the heterophasic propylene polymers are shown in Table 1.

In Table 1, $[\eta]_i$ represents the limiting viscosity of the component (i), $[\eta]_{ii}$ represents the limiting viscosity of the component (ii), $[\eta]_M$ represents the limiting viscosity of the material (D), "(ii) content" represents the content of the component (ii) contained in the material (D), "$C2_M$" represents the content of a structural unit derived from ethylene contained in the material (D) and "$C2_{ii}$" represents the content of a structural unit derived from ethylene contained in the component (ii).

TABLE 1

| Material (D) | $[\eta]_i$ (dL/g) | $[\eta]_{ii}$ (dL/g) | $[\eta]_M$ (dL/g) | (ii) content (% by weight) | C2$_M$ (% by weight) | C2$_{ii}$ (% by weight) |
|---|---|---|---|---|---|---|
| D-1 | 1.02 | 2.98 | 1.46 | 22.4 | 9.1 | 40.4 |
| D-2 | 1.02 | 2.69 | 1.44 | 25.2 | 14.5 | 57.5 |
| D-3 | 0.9 | 2.82 | 1.43 | 27.6 | 13.2 | 47.9 |

[Synthesis of Propylene Polymer Having Double Bonds at the End]

Synthesis Example 1

According to a description of JPA-2005-510546, a dimethylsilanediyl(2,7-dimethyl-4-(4'-tert-butylphenyl)-1-indenyl) (2-isopropyl-4-(4'-tert-butylphenyl)-1-indenyl)zirconium dichloride silica-supporting catalyst (metallocene catalyst (1)) was synthesized.

The inner pressure of a 3 L autoclave was reduced, and a 1.0 mmol/mL triethylaluminum toluene solution (1.0 mL), the metallocene catalyst (1) (64 mg) and heptane (20 mL) were added into the autoclave. Next, butane (400 g) and propylene (400 g) were introduced therein, then, the temperature in the system was raised up to 65° C. and polymerization was started.

During the reaction, the temperature in the autoclave was kept constant, and polymerization was conducted for 90 minutes.

The polymerization was quenched by purging propylene, then, the recovered white powder was dried at 80° C. under reduced pressure, to obtain 105 g of a propylene polymer (AA-1) having a double bond at the end. Mw=323,000, Mn=172,000, [η]=1.42 dl/g and [mmmm]=0.981.

Synthesis Example 2

The same procedure as in Synthesis Example 1 was carried out except that the use amounts of the metallocene catalyst (1), butane and propylene were changed to 63 mg, 600 g and 200 g, respectively, and polymerization was conducted at 70° C. for 240 minutes, to obtain 68 g of a propylene polymer (AA-2) having a double bond at the end. Mw=222,000, Mn=101,000 and [η]=1.02 dl/g.

Synthesis Example 3

The same procedure as in Synthesis Example 1 was carried out except that the use amounts of the metallocene catalyst (1) and propylene were changed to 41 mg and 800 g, respectively, butane was not used and polymerization was conducted at 65° C. for 60 minutes, to obtain 75 g of a propylene polymer (AA-3) having a double bond at the end. Mw=462,000, Mn=246,000 and [η]=1.92 dl/g.

Synthesis Example 4

The same procedure as in Synthesis Example 1 was carried out except that 62 mg of the metallocene catalyst (1) was used, to obtain 87 g of a propylene polymer (AA-4) having a double bond at the end. Mw=329,000, Mn=167,000 and [η]=1.52 dl/g.

Synthesis Example 5

The same procedure as in Synthesis Example 1 was carried out except that the use amounts of the metallocene catalyst (1), butane and propylene were changed to 60 mg, 1400 g and 100 g, respectively, and polymerization was conducted at 80° C. for 180 minutes, to obtain 20 g of a propylene polymer (AA-5) having a double bond at the end. Mw=131,000, Mn=44,000 and [η]=0.56 dl/g.

Synthesis Example 6

The same procedure as in Synthesis Example 1 was carried out except that 53 mg of the metallocene catalyst (1) was used, 400 g of butane was changed to 400 g of heptane, and polymerization was conducted at 65° C. for 180 minutes, to obtain 202 g of a propylene polymer (AA-6) having a double bond at the end. [η]=1.49 dl/g.

Synthesis Example 7

A propylene homopolymer (100 parts by weight) having MFR=0.5 g/10 min and polymerized with a Ziegler Natta catalyst, a peroxide (Perkadox 14, manufactured by kayaku Akuzo Corporation) (0.08 parts by weight), an antioxidant (Irganox 1010) (0.05 parts by weight) and an antioxidant (Irgafos 168) (0.05 parts by weight) were mixed, and melt-kneaded by a twin screw extruder (manufactured by Technovel Corporation, KZW-15, screw diameter: 15 mm, L/D=45, temperature: 250° C., rotation number: 100 rpm), to obtain a propylene polymer (AA-7) having a double bond at the end. Mw=245,000, Mn=111,000 and [η]=1.10 dl/g.

Synthesis Example 8

The same procedure as in Synthesis Example 6 was repeated several times, and all the polymers obtained in respective procedures were mixed. A propylene polymer (AA-8) having a double bond at the end after mixing had Mw=329,000 and Mn=157,000.

[Synthesis of Propylene Polymer of which End was Modified by a Maleic Anhydride]

Synthesis Example 9

Under a nitrogen atmosphere, into a fully dried reaction vessel added were the propylene polymer (AA-1) having a double bond at the end (100 parts by weight), maleic anhydride (450 parts by weight), an antioxidant (BHT) (0.02 parts by weight), octylbenzene (340 parts by weight) and o-dichlorobenzene (130 parts by weight). The resultant mixture was reacted at 180° C. for 24 hours while stirring. Thereafter, 1870 parts by weight of decalin was added thereto, and further, the resultant mixture was cooled down to 70° C. This was poured into acetone, to precipitate a polymer and then the polymer was obtained by filtration, and wash. This was dried at 70° C. under reduced pressure for 3 hours, to obtain 95 parts by weight of a propylene polymer of which end was modified by a maleic anhydride (AB-1). Mw=313,000, Mn=160,000 and the content of the succinic anhydride residue was 0.007 mmol/g.

Synthesis Example 10

Under a nitrogen atmosphere, into a fully dried reaction vessel added were the propylene polymer (AA-2) having a double bond at the end (100 parts by weight), maleic anhydride (600 parts by weight), BHT (0.02 parts by weight), tetralin (390 parts by weight) and o-dichlorobenzene (130 parts by weight). The resultant mixture was reacted at 180° C. for 24 hours while stirring. Thereafter, 1870 parts by weight of decalin was added thereto, and further, the resultant mixture was cooled down to 70° C. This was poured into acetone, to precipitate a polymer and then the polymer was obtained by filtration, and wash. This was dried at 70° C. under reduced pressure for 3 hours, to obtain 94 parts by weight of a propylene polymer of which end was modified by a maleic anhydride (AB-2). Mw=243,000, Mn=107,000 and the content of the succinic anhydride residue was 0.008 mmol/g.

Synthesis Example 11

The same procedure as in Synthesis Example 9 was carried out except that the propylene polymer (AA-3) having a double bond at the end (100 parts by weight) was used instead of the propylene polymer (AA-1) having a double bond at the end (100 parts by weight), to obtain 95 parts by weight of a propylene polymer end was modified by a maleic anhydride (AB-3). Mw=442,000, Mn=214,000 and the content of the succinic anhydride residue was 0.006 mmol/g.

Synthesis Example 12

The same procedure as in Synthesis Example 10 was carried out except that the propylene polymer (AA-4) having a double bond at the end (100 parts by weight) was used instead of the propylene polymer (AA-2) having a double bond at the end (100 parts by weight) and the use amount of maleic anhydride was changed to 420 parts by weight, to obtain 96 parts by weight of a propylene polymer of which end was modified by a maleic anhydride (AB-4). Mw=337,000, Mn=168,000 and the content of the succinic anhydride residue was 0.008 mmol/g.

Synthesis Example 13

The same procedure as in Synthesis Example 10 was carried out except that the propylene polymer (AA-5) having a double bond at the end (100 parts by weight) was used instead of the propylene polymer (AA-2) having a double bond at the end (100 parts by weight) and the use amount of maleic anhydride was changed to 400 parts by weight, to obtain 90 parts by weight of a propylene polymer of which end was modified by a maleic anhydride (AB-5). Mw=128,000, Mn=31,000 and the content of the succinic anhydride residue was 0.017 mmol/g.

Synthesis Example 14

The same procedure as in Synthesis Example 10 was carried out except that the propylene (AA-6) polymer having a double bond at the end (100 parts by weight) was used instead of the propylene polymer (AA-2) having a double bond at the end (100 parts by weight) and the use amount of maleic anhydride was changed to 200 parts by weight, to obtain 99 parts by weight of a propylene polymer of which end was modified by a maleic anhydride (AB-6). Mw=324,000, Mn=164,000 and the content of the succinic anhydride residue was 0.006 mmol/g.

Synthesis Example 15

Under a nitrogen atmosphere, into a fully dried reaction vessel added were the propylene (AA-7) polymer having a double bond at the end (100 parts by weight), maleic anhydride (200 parts by weight), BHT (0.02 parts by weight), tetralin (390 parts by weight) and o-dichlorobenzene (130 parts by weight). The resultant mixture was reacted at 180° C. for 22 hours while stirring. Thereafter, 1340 parts by weight of decalin was added thereto, and further, the resultant mixture was cooled down to 80° C. In to this, 1610 parts by weight of methyl ethyl ketone was dropped, to precipitate a polymer and then the polymer was obtained by filtration, and wash. This was dried at 60° C. under reduced pressure for 4 hours, to obtain 99 parts by weight of a propylene polymer of which end was modified by a maleic anhydride (AB-7). Mw=223,000, Mn=106,000 and the content of the succinic anhydride residue was 0.012 mmol/g.

Synthesis Example 16

Under a nitrogen atmosphere, into a fully dried reaction vessel added were the propylene polymer (AA-8) having a double bond at the end (100 parts by weight), maleic anhydride (200 parts by weight), BHT (0.02 parts by weight), tetralin (390 parts by weight) and o-dichlorobenzene (150 parts by weight). The resultant mixture was reacted at 180° C. for 24 hours while stirring. Thereafter, 1340 parts by weight of decalin was added, and further, the resultant mixture was cooled down to 80° C. Into this, 1610 parts by weight of methyl ethyl ketone was dropped, to precipitate a polymer and then the polymer was obtained by filtration, and wash. This was dried at room temperature under conditions of normal pressure and ventilation for 28 hours, to obtain 94 parts by weight of a propylene polymer of which end was modified by a maleic anhydride (AB-8). Mw=340,000, Mn=181,000 and the content of the succinic anhydride residue was 0.006 mmol/g.

[Synthesis of Ethylene-Propylene Copolymer Having Double Bond at the End]

Synthesis Example 17

The inner pressure of a 3 L autoclave was reduced, and 867 g of toluene was added thereto. After introduction of 150 g of propylene, the temperature in the system was raised to 60° C. The atmosphere in the autoclave was pressurized and stabilized with ethylene having a partial pressure of 0.2 MPa. Next, a 1.0 mmol/mL triisobutylaluminum toluene solution (1.5 mL) was added thereto. Dimethylanilinium tetrakis pentafluoro phenyl borate (1.0 mmol/L solution) (2.5 mL) was added thereto, and thereafter, rac-dimethylsilylenebis(indenyl)zirconium dichloride (metallocene catalyst (2), manufactured by Strem) (7.6 μg) was added into the autoclave and polymerization was started. During the reaction, the temperature in the autoclave was kept constant, and ethylene was added so that the pressure in the autoclave could be constant, and polymerization was conducted until the addition amount reached 30 g. Polymerization was quenched with 5 mL of ethanol, then, ethylene and propylene were purged. The polymer solution was washed with a hydrochloric acid aqueous solution, then, added into ethanol, to precipitate a polymer and then the polymer was dried under reduced pressure at 80° C., to obtain 62 g of an ethylene-propylene copolymer (AC-1) having a double bond at the end. Mw=71,000, Mn=39,000, [η]=0.52 and the content of a structural unit derived from ethylene=39.6% by weight.

Synthesis Example 18

According to a method described in JP-A No. Hei-9-176222, a rac-dimethylsilylenebis(2-methyl-4-phenylindenyl)zirconium dichloride silica-supporting catalyst (metallocene catalyst (3)) was synthesized.

The inner pressure of a 3 L autoclave was reduced, and 867 g of toluene was added thereto. After introduction of 150 g of propylene, the temperature in the system was raised to 60° C. The atmosphere in the autoclave was pressurized and stabilized with ethylene having a partial pressure of 0.8 MPa. Next, a 1.0 mmol/mL triisobutylaluminum toluene solution (1.5 mL) was added thereto. A heptane suspension of the metallocene catalyst (3) (13.7 mg) was added into the autoclave and polymerization was started. During the reaction, the temperature in the autoclave was kept constant, and ethylene was added so that the pressure in the autoclave was constant, and polymerization was conducted until the addition amount reached 15 g. Polymerization was quenched with 5 mL of ethanol, then, ethylene and propylene were purged. The polymer solution was washed with a hydrochloric acid aqueous solution, then, added into ethanol, to precipitate a polymer and then the polymer was dried under reduced pressure at 80° C., to obtain 27 g of an ethylene-propylene copolymer (AC-2) having a double bond at the end. Mw=165,000, Mn=80,000, [η]=1.07 and the content of a structural unit derived from ethylene=37.8% by weight.

Synthesis Example 19

The same procedure as in Synthesis Example 18 was carried out except that 21 mg of the metallocene catalyst (3), 867 g of toluene and 150 g of propylene were used and polymerization was conducted at an ethylene partial pressure of 1.2 MPa and a temperature of 60° C. until the ethylene addition amount reached 20 g, to obtain 82 g of an ethylene-propylene copolymer (AC-3) having a double bond at the end. Mw=167,000, Mn=69,000, [η]=1.15 and the content of a structural unit derived from ethylene=50.1% by weight.

Synthesis Example 20

According to a method described in JP-A No. Hei-4-300887 and JP-A No. Hei-9-176222, a rac-dimethylsilylenebis(2-methyl-1-indenyl)zirconium dichloride silica-supporting catalyst (metallocene catalyst (4)) was synthesized.

The inner pressure of a 3 L autoclave was reduced, and 867 g of toluene was added thereto. After introduction of 150 g of propylene, the temperature in the system was raised to 60° C. The atmosphere in the autoclave was pressurized and stabilized with ethylene having a partial pressure of 0.2 MPa. Next, a 1.0 mmol/mL triisobutylaluminum toluene solution (1.5 mL) was added thereto. A heptane suspension of the metallocene catalyst (4) (27.2 mg) was added into the autoclave and polymerization was started. During the reaction, the temperature in the autoclave was kept constant, and ethylene was added so that the pressure in the autoclave was constant, and polymerization was conducted until the addition amount reached 30 g. Polymerization was quenched with 5 mL of ethanol, then, ethylene and propylene were purged. The polymer solution was washed with a hydrochloric acid aqueous solution, then, added into ethanol, to precipitate a polymer and then the polymer was dried under reduced pressure at 80° C., to obtain 60 g of an ethylene-propylene copolymer (AC-4) having a double bond at the end. Mw=134,000, Mn=69,000, [η]=0.96 and the content of a structural unit derived from ethylene=48.2% by weight.

Synthesis Example 21

The same procedure as in Synthesis Example 18 was carried out except that 31 mg of the metallocene catalyst (3), 910 g of toluene and 120 g of propylene were used and polymerization was conducted at an ethylene partial pressure of 1.2 MPa and a temperature of 60° C. until the ethylene addition amount reached 30 g, to obtain 44 g of an ethylene-propylene copolymer having a double bond at the end. The same experiment was repeated 5 times, then, all the resultant polymers were dissolved in xylene and mixed, then, the resultant mixture was added into methanol, to precipitate a polymer and then the polymer was dried under reduced pressure at 80° C., to obtain an ethylene-propylene copolymer (AC-5) having a double bond at the end. Mw=138,000, Mn=73,000 and the content of a structural unit derived from ethylene=47.6% by weight.

Synthesis Example 22

The same experiment as in Synthesis Example 17 was repeated 5 times, then, all the resultant polymers were dissolved in toluene and mixed, then, the resultant mixture was added into methanol, to precipitate a polymer and then the polymer was dried under reduced pressure at 80° C., to obtain an ethylene-propylene copolymer (AC-6) having a double bond at the end. Mw=63,000, Mn=35,000 and the content of a structural unit derived from ethylene=42.3% by weight.

Synthesis Example 23

The inner pressure of a 300 L autoclave was reduced, and 214 kg of toluene was added thereto. A 5 wt % triisobutylaluminum toluene solution (2.7 kg) was added thereto, and 23 kg of propylene was introduced, then, the temperature in the system was raised to 60° C. The atmosphere in the autoclave was pressurized and stabilized with ethylene having a partial pressure of 0.2 MPa. Next, dimethylanilinium tetrakis pentafluoro phenyl borate (AB) (0.2 mmol/L) (1.15 L) and the metallocene catalyst (2) (0.1 mmol/L) (0.09 L) were added thereto into the autoclave and polymerization was started. During the reaction, the temperature in the autoclave was kept constant, and ethylene was added so that the pressure in the autoclave was constant, and polymerization was conducted until the addition amount reached 6.6 kg. Polymerization was quenched with 1.4 L of ethanol, then, ethylene and propylene were purged. The polymer solution was washed with a sodium hydroxide aqueous solution once and with pure water 3 times, then, toluene was partially distilled off, to obtain 101.1 kg of a 11.4 wt % toluene solution of an ethylene-propylene copolymer (AC-7) having a double bond at the end. A part of this was added into ethanol, to precipitate a polymer and then the polymer dried under reduced pressure at 80° C., to isolate the polymer. Mw=73,000, Mn=37,000, [η]=0.56 and the content of a structural unit derived from ethylene=51.0% by weight.

[Synthesis of Ethylene-Propylene Copolymer of which End was Modified by Hydroxyl Group Modified, Ethylene-Propylene Copolymer End was Modified by Amino Group Modified and Hydrogenated Polybutadiene End was Modified by Amino Group Modified]

Synthesis Example 24

Under a nitrogen atmosphere, into a fully dried 1 L separable flask added were the ethylene-propylene copolymer (AC-1) having a double bond at the end (25 g) and dehydrated tetrahydrofuran (1000 mL). The resultant mixture was stirred at room temperature to dissolve them completely. To this solution was added 29 mL of a 0.5 M tetrahydrofuran solution of 9-borabicyclo[3.3.1]nonane (9-BBN), and the resultant mixture was reacted at 25° C. for 5 hours. To this solution added was 15 mL of a 3 N sodium hydroxide aqueous solution. Further, 5.0 mL of 30 wt % hydrogen peroxide water was dropped. The resultant mixture was stirred at room temperature for 2 hours, then, 35 mL of a saturated potassium carbonate aqueous solution and 250 mL of n-hexane were added. The organic layer was washed with water 3 times, then, the organic layer was poured into acetone, to precipitate a polymer and then the polymer was obtained by filtration, and wash. This was dried at 80° C. under reduced pressure for 3 hours, to obtain 19.0 g of an ethylene-propylene copolymer of which end was modified by a hydroxyl group (AD-1). Mw=72,000, Mn=40,000 and the hydroxyl group content was 0.058 mmol/g.

Synthesis Example 25

The same procedure as in Synthesis Example 24 was carried out except that 26.4 g of the ethylene-propylene copolymer (AC-2) having a double bond at the end, 1056 mL of dehydrated tetrahydrofuran, 15 mL of a 0.5 M tetrahydrofuran solution of 9-BBN, 7.5 mL of 3 N sodium hydroxide, 2.6 mL of 30 wt % hydrogen peroxide water and 18 mL of a saturated potassium carbonate aqueous solution were used, to obtain 25.3 g of an ethylene-propylene copolymer of which end was modified by a hydroxyl group (AD-2). Mw=176,000, Mn=101,000 and the hydroxyl group content was 0.034 mmol/g.

Synthesis Example 26

The same procedure as in Synthesis Example 24 was carried out except that 25.0 g of the ethylene-propylene copolymer (AC-3) having a double bond at the end, 1000 mL of dehydrated tetrahydrofuran, 12.2 mL of a 0.5 M tetrahydrofuran solution of 9-BBN, 6.1 mL of 3 N sodium hydroxide, 2.1 mL of 30 wt % hydrogen peroxide water and 15 mL of a saturated potassium carbonate aqueous solution were used, to obtain 24.2 g of an ethylene-propylene copolymer of which end was modified by a hydroxyl group (AD-3). Mw=171,000, Mn=76,000 and the hydroxyl group content was 0.030 mmol/g.

Synthesis Example 27

Under a nitrogen atmosphere, into a fully dried reaction vessel added were the ethylene-propylene copolymer (AC-4) having a double bond at the end (13 g), maleic anhydride (60 g), BHT (3 mg) and o-dichlorobenzene (60 g). The resultant mixture was reacted at 180° C. for 24 hours while stirring. After cooling to 50° C., the solution was added into acetone, to precipitate a polymer and then the polymer was dried under reduced pressure at 70° C. for 3 hours, to obtain 12.5 g of an ethylene-propylene copolymer of which end was modified by a maleic anhydride. Next, under a nitrogen atmosphere, into a fully dried reaction vessel were added the ethylene-propylene copolymer of which end was modified by a maleic anhydride (12.3 g) obtained above, 2-amino-1-ethanol (0.63 g), p-toluenesulfonic acid monohydrate (144 mg), BHT (25 mg) and xylene (123 g). The resultant mixture was reacted at 60° C. for 6 hours while stirring. This was poured into acetone, to precipitate a polymer and then the polymer was obtained by filtration, and washed. This was dried at 70° C. under reduced pressure for 3 hours, to obtain 11.4 g of an ethylene-propylene copolymer of which end was modified by a hydroxyl group (AD-4). Mw=123,000, Mn=65,000 and the hydroxyl group content was 0.023 mmol/g.

Synthesis Example 28

The same procedure as in Synthesis Example 24 was carried out except that the ethylene-propylene copolymer (AC-5) having a double bond at the end (25.1 g), dehydrated tetrahydrofuran (1000 mL), a 0.5 M tetrahydrofuran solution of 9-BBN (14.9 mL), 3 N sodium hydroxide (7.5 mL), 30 wt % hydrogen peroxide water (2.5 mL) and a saturated potassium carbonate aqueous solution (18 mL) were used, to obtain 24.2 g of an ethylene-propylene copolymer of which end was modified by a hydroxyl group (AD-5). Mw=135,000, Mn=67,000 and the hydroxyl group content was 0.030 mmol/g.

Synthesis Example 29

The same procedure as in Synthesis Example 24 was carried out except that the ethylene-propylene copolymer (AC-6) having a double bond at the end (50 g), dehydrated tetrahydrofuran (1000 mL), a 0.5 M tetrahydrofuran solution of 9-BBN (54 mL), 3 N sodium hydroxide (27 mL), 30 wt % hydrogen peroxide water (7.8 mL), a saturated potassium carbonate aqueous solution (40 mL) and n-heptane (650 mL) instead of n-hexane were used, to obtain 49.3 g of an ethylene-propylene copolymer of which end was modified by a hydroxyl group (AD-6). Mw=64,000, Mn=35,000 and the hydroxyl group content was 0.065 mmol/g.

Synthesis Example 30

Under a nitrogen atmosphere, into a fully dried reaction vessel added were the ethylene-propylene copolymer (AC-6) having a double bond at the end (9 g), maleic anhydride (45 g), BHT (1.8 mg), tetralin (17.5 g) and o-dichlorobenzene (5.9 g). The resultant mixture was reacted at 180° C. for 24 hours while stirring. After cooling to 50° C., the solution was added into acetone, to precipitate a polymer and then the polymer was dried under reduced pressure at 70° C. for 3 hours, to obtain 7.5 g of an ethylene-propylene copolymer of which end was modified by a maleic anhydride. Next, under a nitrogen atmosphere, into a fully dried reaction vessel were added the ethylene-propylene copolymer of which end was modified by a maleic anhydride (7 g) obtained above, 6-amino-1-hexanol (0.39 g), BHT (14 mg) and o-dichlorobenzene (45.5 g). The resultant mixture was reacted at 60° C. for 6 hours while stirring. This was poured into acetone, to precipitate a polymer and then the polymer was obtained by filtration, and washed. This was dried at 70° C. under reduced pressure for 3 hours, to obtain 6.6 g of an ethylene-propylene copolymer of which end was modified by a hydroxyl group (AD-7). Mw=66,000, Mn=37,000 and the hydroxyl group content was 0.041 mmol/g.

Synthesis Example 31

Under a nitrogen atmosphere, into a fully dried reaction vessel added were 100 parts by weight of a 11.4 wt % toluene solution of the ethylene-propylene copolymer (AC-7) having a double bond at the end, o-dichlorobenzene (60 parts by weight) and BHT (0.02 parts by weight). The resultant mixture was heated at 170° C. while stirring, to distill off 130 parts by weight of distillation liquid composed of toluene and o-dichlorobenzene. The residual liquid was cooled to 50° C., then, maleic anhydride (10 parts by weight) was added thereto, and the resultant mixture was reacted at 170° C. for 16 hours while stirring. Next, o-dichlorobenzene (100 parts by weight) was added thereto and the resultant mixture was heated at 180° C., to distill off about 100 parts by weight of distillation liquid composed of o-dichlorobenzene and maleic anhydride. This operation was repeated 5 times, then, the solution was cooled down to room temperature, to obtain 62 parts by weight of a 17.2% o-dichlorobenzene solution of the ethylene-propylene copolymer of which end was modified by a maleic anhydride. Next, under a nitrogen atmosphere, into a fully dried reaction vessel were added 100 parts by weight of a 17.2% o-dichlorobenzene solution of the ethylene-propylene copolymer of which end was modified by a maleic anhydride obtained above and 7.8 parts by weight of 2-aminoethanol, and the resultant mixture was reacted at 120° C. for 6 hours while stirring. To this was added 58 parts by weight of heptane to dilute the reaction liquid, then, the diluted liquid was added into acetone, to precipitate a polymer and then the polymer was dried under reduced pressure at 80° C., to obtain 15.2 parts by weight an ethylene-propylene copolymer of which end was modified by a hydroxyl group (AD-8). Mw=69,000, Mn=33,000 and the hydroxyl group content was 0.070 mmol/g.

Synthesis Example 32

Under a nitrogen atmosphere, into a fully dried reaction vessel were added 100 parts by weight of a 17.2% o-dichlorobenzene solution of the ethylene-propylene copolymer of which end was modified by a maleic anhydride obtained in Synthesis Example 31 and 8.0 parts by weight of ethylenediamine, and the resultant mixture was reacted at 140° C. for 6 hours while stirring. The reaction liquid was added into acetone, to precipitate a polymer, to obtain a crude polymer. This crude polymer was dissolved in 110 parts by weight of xylene, and the solution was added into acetone, to again precipitate a polymer and then the polymer was dried under reduced pressure at 100° C., to obtain 15.3 parts by weight of an end amino group modified ethylene-propylene copolymer (AD-9). Mw=82,000, Mn=41,000 and the amino group content was 0.026 mmol/g.

Synthesis Example 33

The inner pressure of a 3 L autoclave was reduced, and 1000 g of heptane was added thereto. After introducing 100 g of butadiene, the temperature in the system was raised to 65° C. Tetrahydrofuran (1.0 mL) and a toluene solution of 4-(N,N-bis(trimethylsilyl)aminomethyl)phenyllithium (5.0 mmol) were added and polymerization was started, the resultant mixture was reacted at 70° C. for 1 hour, and ethanol (0.14 mL) was added to quench polymerization. Next, the temperature in the system was raised to 80° C., the atmosphere in the autoclave was pressurized and stabilized with hydrogen having a partial pressure of 1.0 MPa, and a 0.5 mmol/mL μ-chlorobis(cyclopentadienyl)(dimethylaluminum)-μ-methylenetitanium toluene solution (manufactured by Tokyo Chemical Industry Co., Ltd.) (3.0 mL) was added and the hydrogenation reaction was started. The resultant mixture was reacted at 80° C. for 1 hour while adding hydrogen so that the pressure in the autoclave was constant during the reaction. After purging hydrogen, the polymer solution was transferred to a glass vessel, and methanesulfonic acid was added and a de-protection reaction was carried out, then, the reaction liquid was added into ethanol, to precipitate a polymer and then the polymer was dried under reduced pressure at 80° C., to obtain 98 g of a hydrogenated polybutadiene of which end was modified by an amino group (AD-10). Mw=66,000, Mn=25,000, [η]=0.62, the hydrogenation rate of a carbon-carbon double bond was 98.9%, the number of short chain branches other than a methyl group per 1000 C was 58 and the amino group content was 0.039 mmol/g.

Synthesis Example 34

The inner pressure of a 3 L autoclave is reduced, and non-polar hydrocarbon solvents such as hexane, heptane, and cyclohexane is added to the autoclave. Predetermined amount of butadiene is added thereto, and then the temperature in the system set −75° C. to 80° C. Tetrahydrofuran, ethylene glycol dimethyl ether, or N,N,N',N'-tetramethylethylenediamine as Lewis base and n-butyllithium, tert-butyllithium or phenyllithium solution are added to the autoclave. The solvent of the organic metal compound solution is non-polar hydrocarbon such as hexane, heptane and cyclohexane. A polymerization is conducted at −30° C. to 100° C. for 10 minutes to 12 hours. Then, a terminator selected from those described in KOBUNSHI, 47, February, 1998, 70-73 and Makromolekulare Chemie, Rapid Communication, 3, 59-63, 1982 is added thereto to quench polymerization. Then, the temperature in the system is set at 20° C. to 100° C. and hydrogen is added to the autoclave so that the partial pressure of hydrogen can be 0.2 MPa to 10 MPa. A toluene solution containing a mixture trialkylaluminium and dichlorobis (cyclopentadienyl) titanium is added to the autoclave and the hydrogenation reaction is started. The molar equivalent of the dichlorobis (cyclopentadienyl) titanium is 0.5 or less with respect to trialkylaluminium. The toluene solution mixture reacts at 20° C. to 100° C. for 30 minutes to 12 hours. Hydrogen is continuously added thereto so that the pressure in the autoclave can be constant during the reaction. Alcohol is added to the autoclave and the hydrogenated reaction is quenched by purging hydrogen. The resultant polymer solution adds into ethanol to precipitate polymer. The resultant polymer dry under reduced pressure at 50° C. to 150° C. to obtain hydrogenated polybutadiene of which end is modified by an amino group.

[Synthesis of Propylene Polymer Composition]

Example 1

Under a nitrogen atmosphere, into a fully dried reaction vessel added were the propylene polymer of which end was modified by an maleic anhydride (AB-1) (100 parts by weight), the end hydroxyl group modified ethylene-propylene copolymer (AD-1) (22 parts by weight), p-toluenesulfonic acid monohydrate (0.2 parts by weight), an antioxidant (BHT) (0.25 parts by weight) and decahydronaphthalene (760 parts by weight). The resultant mixture was reacted at 100° C. for 18 hours while stirring. Thereafter, 3000 parts by weight of decahydronaphthalene was added, and further, the resultant mixture was cooled down to 70° C. This was poured into acetone, to precipitate a polymer and then the polymer was obtained by filtration, and wash, and dried in vacuum at 80° C. for 3 hours, to obtain a propylene polymer composition (A-1). Further, to 100 parts by weight of the composition was added 4500 parts by weight of n-heptane, and the resultant mixture was stirred at 25° C. for 6 hours, then, an insoluble portion was obtained by filtration, and dried in vacuum at 80° C. for 3 hours, to obtain 96 parts by weight of a n-heptane-insoluble portion of the propylene polymer composition (A-1). The structure values are shown in Table 2.

Example 2

Under a nitrogen atmosphere, into a fully dried reaction vessel added were the propylene polymer of which end was modified by an maleic anhydride (AB-2) (100 parts by weight), the end hydroxyl group modified ethylene-propylene copolymer (AD-2) (57 parts by weight), p-toluenesulfonic acid monohydrate (0.9 parts by weight), an antioxidant (BHT) (0.2 parts by weight) and decahydronaphthalene (980 parts by weight). The resultant mixture was reacted at 100° C. for 24 hours while stirring. Thereafter, 3900 parts by weight of decahydronaphthalene was added, and further, the resultant mixture was cooled down to 70° C. This was poured into acetone, to precipitate a polymer and then the polymer was obtained by filtration, and wash, and dried in vacuum at 80° C. for 3 hours, to obtain a propylene polymer composition (A-2). Further, to 100 parts by weight of the composition was added 4500 parts by weight of n-heptane, and the resultant mixture was stirred at 25° C. for 6 hours, then, an insoluble portion was obtained by filtration, and dried in vacuum at 80° C. for 3 hours, to obtain 92 parts by weight of a n-heptane-insoluble portion of the propylene polymer composition (A-2). The structure values are shown in Table 2.

Example 3

Under a nitrogen atmosphere, into a fully dried reaction vessel added were the propylene polymer of which end was modified by an maleic anhydride (AB-3) (100 parts by weight), the end hydroxyl group modified ethylene-propylene copolymer (AD-3) (28 parts by weight), p-toluenesulfonic acid monohydrate (0.7 parts by weight), an antioxidant (BHT) (0.2 parts by weight) and decahydronaphthalene (800 parts by weight). The resultant mixture was reacted at 100° C. for 24 hours while stirring. Thereafter, 3200 parts by weight of decahydronaphthalene was added, and further, the resultant mixture was cooled down to 70° C. This was poured into acetone, to precipitate a polymer and then the polymer was obtained by filtration, and wash, and dried in vacuum at 80° C. for 3 hours, to obtain a propylene polymer composition (A-3). Further, to 100 parts by weight of the composition was added 45 parts by weight of n-heptane, and the resultant mixture was stirred at 25° C. for 6 hours, then, an insoluble portion was obtained by filtration, and dried in vacuum at 80° C. for 3 hours, to obtain 98 parts by weight of a n-heptane-insoluble portion of the propylene polymer composition (A-3). The structure values are shown in Table 2.

Example 4

Under a nitrogen atmosphere, into a fully dried reaction vessel added were the propylene polymer of which end was modified by an maleic anhydride (AB-4) (100 parts by weight), the end hydroxyl group modified ethylene-propylene copolymer (AD-4) (50 parts by weight), p-toluenesulfonic acid monohydrate (2.3 parts by weight), an antioxidant (BHT) (0.1 part by weight) and decahydronaphthalene (920 parts by weight). The resultant mixture was reacted at 100° C. for 24 hours while stirring. Thereafter, 3700 parts by weight of decahydronaphthalene was added, and further, the resultant mixture was cooled down to 70° C. This was poured into acetone, to precipitate a polymer and then the polymer obtained by filtration, and wash, and dried in vacuum at 80° C. for 3 hours, to obtain a propylene polymer composition (A-4). Further, to 100 parts by weight of the composition was added 4500 parts by weight of n-heptane, and the resultant mixture was stirred at 25° C. for 6 hours, then, an insoluble portion was obtained by filtration, and dried in vacuum at 80° C. for 3 hours, to obtain 85 parts by weight of a n-heptane-insoluble portion of the propylene polymer composition (A-4). The structure values are shown in Table 2.

Comparative Example 1

Under a nitrogen atmosphere, into a fully dried reaction vessel added were the propylene polymer of which end was modified by an maleic anhydride (AB-5) (100 parts by weight), the end hydroxyl group modified ethylene-propylene copolymer (AD-5) (105 parts by weight), p-toluenesulfonic acid monohydrate (1.3 parts by weight), an antioxidant (BHT) (0.2 parts by weight) and decahydronaphthalene (1240 parts by weight). The resultant mixture was reacted at 100° C. for 24 hours while stirring. Thereafter, 5000 parts by weight of decahydronaphthalene was added, and further, the resultant mixture was cooled down to 70° C. This was poured into acetone, to precipitate a polymer and then the polymer was obtained by filtration, and wash, and dried in vacuum at 80° C. for 3 hours, to obtain a propylene polymer composition (A-5). Further, to 100 parts by weight of the composition was added 70 parts by weight of n-heptane, and the resultant mixture was stirred at 25° C. for 6 hours, then, an insoluble portion was obtained by filtration, and dried in vacuum at 80° C. for 3 hours, to obtain 96 parts by weight of a n-heptane-insoluble portion of the propylene polymer composition (A-5). The structure values are shown in Table 2.

Example 6

Under a nitrogen atmosphere, into a fully dried reaction vessel added were the propylene polymer of which end was modified by an maleic anhydride (AB-6) (100 parts by weight), the end hydroxyl group modified ethylene-propylene copolymer (AD-6) (21 parts by weight), p-toluenesulfonic acid monohydrate (0.7 parts by weight), an antioxidant (BHT) (0.2 parts by weight) and decahydronaphthalene (750 parts by weight). The resultant mixture was reacted at 100° C. for 6 hours while stirring. Thereafter, 1400 parts by weight of decahydronaphthalene was added, and further, the resultant mixture was cooled down to 75° C. To this was added 1740 parts by weight of methyl ethyl ketone, to precipitate a polymer and then the polymer was obtained by filtration, and wash, to obtain a propylene polymer composition (A-6). Further, to 100 parts by weight of the composition was added 7000 parts by weight of n-heptane, and the resultant mixture was stirred at 25° C. for 6 hours, then, an insoluble component was obtained by filtration, and dried in vacuum at 80° C. for 3 hours, to obtain 98.5 parts by weight a n-heptane-insoluble portion of the propylene polymer composition (A-6). The structure values are shown in Table 2.

Example 7

Under a nitrogen atmosphere, into a fully dried reaction vessel added were the propylene polymer of which end was modified by an maleic anhydride (AB-7) (100 parts by weight), the end hydroxyl group modified ethylene-propylene copolymer (AD-6) (32 parts by weight), p-toluenesulfonic acid monohydrate (1.1 parts by weight), an antioxidant (BHT) (0.2 parts by weight) and decahydronaphthalene (810 parts by weight). The resultant mixture was reacted at 100° C. for 18 hours while stirring. Thereafter, 1500 parts by weight of decahydronaphthalene was added, and further, the resultant mixture was cooled down to 75° C. To this was added 1880 parts by weight of methyl ethyl ketone, to precipitate a polymer and then the polymer was obtained by filtration, and wash, and dried in vacuum at 80° C. for 3 hours, to obtain a propylene polymer composition (A-7). Further, to 100 parts by weight of the composition was added 7000 parts by weight of n-heptane, and the resultant mixture was stirred at 25° C. for 6 hours, then, an insoluble component was obtained by filtration, and dried in vacuum at 80° C. for 3 hours, to obtain 96.5 parts by weight of a n-heptane-insoluble portion of the propylene polymer composition (A-7). The structure values are shown in Table 2.

Example 8

Under a nitrogen atmosphere, into a fully dried reaction vessel added were the propylene polymer of which end was modified by an maleic anhydride (AB-6) (100 parts by weight), the end hydroxyl group modified ethylene-propylene copolymer (AD-7) (20 parts by weight), p-toluenesulfonic acid monohydrate (0.6 parts by weight), an antioxidant (BHT) (0.2 parts by weight) and decahydronaphthalene (850 parts by weight). The resultant mixture was reacted at 100° C. for 18 hours while stirring. Thereafter, 3400 parts by weight of decahydronaphthalene was added, and further, the resultant mixture was cooled down to 70° C. This was poured into acetone, to precipitate a polymer and then the polymer was obtained by filtration, and wash, and dried in vacuum at 80° C. for 3 hours, to obtain a propylene polymer composition (A-8). Further, to 100 parts by weight of the composition was added 7000 parts by weight of n-heptane, and the resultant mixture was stirred at 25° C. for 6 hours, then, an insoluble portion was obtained by filtration, and dried in vacuum at 80° C. for 3 hours, to obtain 96 parts by weight of a n-heptane-insoluble portion of the propylene polymer composition (A-8). The structure values are shown in Table 2.

Example 9

Under a nitrogen atmosphere, into a fully dried reaction vessel added were the propylene polymer of which end was modified by an maleic anhydride (AB-8) (100 parts by weight), the end hydroxyl group modified ethylene-propylene copolymer (AD-8) (27 parts by weight), p-toluenesulfonic acid monohydrate (0.8 parts by weight), an antioxidant (BHT) (0.2 parts by weight) and decahydronaphthalene (750 parts by weight). The resultant mixture was reacted at 100° C. for 16 hours while stirring. Thereafter, 2000 parts by weight of xylene was added, and further, the resultant mixture was cooled down to 80° C. To this was added 1350 parts by weight of methyl ethyl ketone, to precipitate a polymer and then the polymer was obtained by filtration, and wash, to obtain a crude polymer. Subsequently, the total amount of such a crude polymer was suspended in 3500 parts by weight of n-heptane, and the resultant mixture was stirred at 25° C. for 6 hours, then, an insoluble portion was obtained by filtration, and washed, and dried in vacuum at 80° C. for 3 hours, to obtain 101 parts by weight of a n-heptane-insoluble portion of the propylene polymer composition (A-9). The structure values are shown in Table 2.

Example 10

The propylene polymer of which end was modified by a maleic anhydride (AB-8) (80 parts by weight), the end amino group modified ethylene-propylene copolymer (AD-9) (20 parts by weight), an antioxidant (SUMILIZER GA80, manufactured by Sumitomo Chemical Co., Ltd.) (0.2 parts by weight) and an antioxidant (SUMILIZER GP, manufactured by Sumitomo Chemical Co., Ltd.) (0.2 parts by weight) were mixed uniformly, and the resultant mixture was melt-kneaded using a desktop small kneader (Xplore manufactured by DSM, 15 cc twin screw micro compounder) under a nitrogen atmosphere at a set temperature of 210° C. and a screw rotation number of 200 rpm for 5 minutes, to obtain a propylene polymer composition (A-10). This experiment was repeated several times. To 100 parts by weight of the composition was added 18000 parts by weight of p-xylene, and the resultant mixture was dissolved by heating, then, cooled down to 5° C., thereafter, allowed to stand still at room temperature for 2 hours, to precipitate a polymer and then the polymer was obtained by filtration, and wash. Then, the product was dried under reduced pressure at 80° C. for 3 hours, to obtain 93 parts by weight of a p-xylene-insoluble portion of the propylene polymer composition (A-10). The structure values are shown in Table 2.

Example 11

The propylene polymer of which end was modified by a maleic anhydride (AB-8) (80 parts by weight), the hydrogenated polybutadiene of which end was modified by an amino group (AD-10) (20 parts by weight), an antioxidant (SUMILIZER GA80, manufactured by Sumitomo Chemical Co., Ltd.) (0.2 parts by weight) and an antioxidant (SUMILIZER GP, manufactured by Sumitomo Chemical Co., Ltd.) (0.2 parts by weight) were mixed uniformly, and the resultant mixture was meld-kneaded using a Laboplasto-mill (manufactured by Toyo Seiki Seisaku-sho, Ltd.) under a nitrogen atmosphere at a set temperature of 210° C. and a screw rotation number of 80 rpm for 5 minutes, to obtain a propylene polymer composition (A-11). Further, to 100 parts by weight of the composition was added 4500 parts by weight of p-xylene, and the resultant mixture was dissolved by heating, then, cooled down to 5° C., thereafter, allowed to stand still at room temperature for 2 hours, to precipitate a polymer and then the polymer was obtained by filtration, and wash. Then, the product was dried under reduced pressure at 80° C. for 3 hours, to obtain 96 parts by weight of a p-xylene-insoluble portion of the propylene polymer composition (A-11). The structure values are shown in Table 2.

TABLE 2

| | | | | | | | content of ethylene in elastomer block (II) % by weight | | Difference in ethylene content % by weight | | Proportion y of the component (C) % by weight |
|---|---|---|---|---|---|---|---|---|---|---|---|
| Propylene polymer composition | Mw × 10⁻³ | Mn × 10⁻³ | [η] dl/g | Content of ethylene % by weight | Number of short chain branch number/ 1000 C | content of elastomer block (II) % by weight | | Mn$_{PP}$/ Mn$_{EL}$ | | Tm ° C. | |
| (A-1) | 378 | 197 | 1.68 | 6.6 | | 16.7 | 39.3 | 4.0 | 0.3 | 156.8 | 97 |
| (A-2) | 344 | 162 | 1.44 | 9.4 | | 22.9 | 41.2 | 1.3 | 3.4 | 155.4 | 65 |
| (A-3) | 625 | 281 | 2.58 | 10.2 | | 19.2 | 53 | 2.8 | 2.9 | 156.6 | 92 |
| (A-4) | 329 | 160 | 1.79 | 9.4 | | 20.7 | 45.5 | 2.6 | 2.7 | 157.7 | 82 |
| (A-5) | 224 | 108 | 1.18 | 23.6 | | 64.2 | 36.8 | 0.4 | 6.2 | 147.5 | 84 |
| (A-6) | 423 | 208 | | 5.4 | | 15.1 | 35.7 | 5.0 | 6.6 | 156.0 | 77 |
| (A-7) | 322 | 146 | | 8.8 | | 24.9 | 35.4 | 3.1 | 6.9 | 160.4 | 98 |
| (A-8) | 344 | 171 | | 5.2 | | 14.4 | 35.8 | 4.6 | 6.5 | 157.0 | 80 |
| (A-9) | 345 | 171 | | 4.2 | | 9.3 | 44.9 | 5.5 | 6.1 | 156.5 | 65 |
| (A-10) | 359 | 181 | | 7.1 | | 15.4 | 46.1 | 4.5 | 4.9 | 157.9 | 92 |
| (A-11) | 322 | 156 | | — | 6.5 | 12.5 | — | 7.2 | — | 157.3 | 92 |

[Evaluation of Physical Property of Composition]

Example 12

The heterophasic propylene polymer (D-1) (100 parts by weight), the n-heptane-insoluble portion (2 parts by weight) of the propylene polymer composition (A-1), SUMILIZER GA80 (manufactured by Sumitomo Chemical Co., Ltd.) (0.1 part by weight), SONGNOX 6260 (antioxidant, manufactured by Matsubara Industry, Inc.) (0.1 part by weight) and calcium stearate (0.05 parts by weight) were mixed uniformly, then, the resultant mixture was melt-kneaded by a twin screw extruder (KZW-15TW manufactured by Technovel Corporation, L/D=45, temperature: 220° C., rotation number: 300 rpm), to obtain pellets for evaluation. The resultant pellets for evaluation were injection-molded under the conditions. The properties of the resultant injection-molded body are shown in Table 3.

Example 13

The same procedure as in Example 12 was carried out except that 2 parts by weight of the n-heptane-insoluble portion of the propylene polymer composition (A-2) was used instead of the n-heptane-insoluble portion of the propylene polymer composition (A-1). The properties of the resultant injection-molded body are shown in Table 3.

Example 14

The same procedure as in Example 12 was carried out except that 2 parts by weight of the n-heptane-insoluble portion of the propylene polymer composition (A-3) was used instead of the n-heptane-insoluble portion of the propylene polymer composition (A-1). The properties of the resultant injection-molded body are shown in Table 3.

Example 15

The same procedure as in Example 12 was carried out except that 2 parts by weight of the n-heptane-insoluble portion of the propylene polymer composition (A-4) was used instead of the n-heptane-insoluble portion of the propylene polymer composition (A-1). The properties of the resultant injection-molded body are shown in Table 3.

Comparative Example 2

The same procedure as in Example 12 was carried out except that the n-heptane-insoluble portion of the propylene polymer composition (A-1) was not used. The properties of the resultant injection-molded body are shown in Table 3.

Comparative Example 3

The same procedure as in Example 12 was carried out except that 2 parts by weight of the n-heptane-insoluble portion of the propylene polymer composition (A-5) was used instead of the n-heptane-insoluble portion of the propylene polymer composition (A-1). The properties of the resultant injection-molded body are shown in Table 3.

Comparative Example 4

The same procedure as in Example 12 was carried out except that 2 parts by weight of an ethylene-octene copolymer (ENGAGE 8842, manufactured by The Dow Chemical Company) was used instead of the n-heptane-insoluble portion of the propylene polymer composition (A-1). The properties of the resultant injection-molded body are shown in Table 3.

Example 16

The heterophasic propylene polymer (D-2) (100 parts by weight), the n-heptane-insoluble portion (2 parts by weight) of the propylene polymer composition (A-1), SUMILIZER GA80 (0.1 part by weight), SONGNOX 6260 (0.1 part by weight) and calcium stearate (0.05 parts by weight) were mixed uniformly, then, the resultant mixture was melt-kneaded by a twin screw extruder (KZW-15TW manufactured by Technovel Corporation, L/D=45, temperature: 220° C., rotation number: 300 rpm), to obtain pellets for evaluation. The resultant pellets for evaluation were injection-molded under the conditions. The properties of the resultant injection-molded body are shown in Table 3.

Comparative Example 5

The same procedure as in Example 16 was carried out except that the n-heptane-insoluble portion of the propylene polymer composition (A-1) was not used. The properties of the resultant injection-molded body are shown in Table 3.

Example 17

The heterophasic propylene polymer (D-3) (89 parts by weight), a propylene homopolymer (11 parts by weight) having [η]=0.93 dl/g polymerized with a Ziegler Natta catalyst, the n-heptane-insoluble portion (2 parts by weight) of the propylene polymer composition (A-6), SUMILIZER GA80 (0.1 part by weight), SONGNOX 6260 (0.1 part by weight) and calcium stearate (0.05 parts by weight) were mixed uniformly, then, the resultant mixture was melt-kneaded by a twin screw extruder (KZW-15TW manufactured by Technovel Corporation, L/D=45, temperature: 220° C., rotation number: 300 rpm), to obtain pellets for evaluation. The resultant pellets for evaluation were injection-molded under the conditions. The properties of the resultant injection-molded body are shown in Table 3.

Example 18

The same procedure as in Example 17 was carried out except that 2 parts by weight of the propylene polymer composition (A-6) was used instead of the n-heptane-insoluble portion of the propylene polymer composition (A-6). The properties of the resultant injection-molded body are shown in Table 3.

Example 19

The same procedure as in Example 17 was carried out except that 2 parts by weight of the n-heptane-insoluble portion of the propylene polymer composition (A-7) was used instead of the n-heptane-insoluble portion of the propylene polymer composition (A-6). The properties of the resultant injection-molded body are shown in Table 3.

Example 20

The same procedure as in Example 17 was carried out except that 2 parts by weight of the n-heptane-insoluble portion of the propylene polymer composition (A-8) was used instead of the heptane-insoluble portion of the propylene polymer composition (A-6). The properties of the resultant injection-molded body are shown in Table 3.

Example 21

The same procedure as in Example 17 was carried out except that 2 parts by weight of the n-heptane-insoluble portion of the propylene polymer composition (A-9) was used instead of the n-heptane-insoluble portion of the propylene polymer composition (A-6). The properties of the resultant injection-molded body are shown in Table 3.

Example 22

The same procedure as in Example 17 was carried out except that 2 parts by weight of the n-heptane-insoluble portion of the propylene polymer composition (A-10) was used instead of the n-xylene-insoluble portion of the propylene polymer composition (A-6). The properties of the resultant injection-molded body are shown in Table 3.

Example 23

The same procedure as in Example 17 was carried out except that 2 parts by weight of the propylene polymer composition (A-10) was used instead of the n-heptane-insoluble portion of the propylene polymer composition (A-6). The properties of the resultant injection-molded body are shown in Table 3.

Example 24

The same procedure as in Example 17 was carried out except that 2 parts by weight of the p-xylene-insoluble portion of the propylene polymer composition (A-11) was used instead of the n-heptane-insoluble portion of the propylene polymer composition (A-6). The properties of the resultant injection-molded body are shown in Table 3.

Comparative Example 6

The same procedure as in Example 17 was carried out except that the n-heptane-insoluble portion of the propylene polymer composition (A-6) was not used. The properties of the resultant injection-molded body are shown in Table 3.

Comparative Example 7

The same procedure as in Example 17 was carried out except that 2 parts by weight of an ethylene-octene copolymer (ENGAGE 8842, manufactured by The Dow Chemical Company) was used instead of the n-heptane-insoluble portion of the propylene polymer composition (A-6). The properties of the resultant injection-molded body are shown in Table 3.

Comparative Example 8

The same procedure as in Example 17 was carried out except that 2 parts by weight of an ethylene-butene copolymer (ENGAGE 7467, manufactured by The Dow Chemical Company) was used instead of the n-heptane-insoluble portion of the propylene polymer composition (A-6). The properties of the resultant injection-molded body are shown in Table 3.

Comparative Example 9

The same procedure as in Example 17 was carried out except that 2 parts by weight of a styrene-ethylene-butene-styrene copolymer (Tuftec H1062, manufactured by Asahi Kasei Chemicals Corporation) was used instead of the n-heptane-insoluble portion of the propylene polymer composition (A-6). The properties of the resultant injection-molded body are shown in Table 3.

Comparative Example 10

The same procedure as in Example 17 was carried out except that 2 parts by weight of a propylene-ethylene copolymer (Vistamaxx 3000, manufactured by Exxon Mobil Chemical Company) was used instead of the n-heptane-insoluble portion of the propylene polymer composition (A-6). The properties of the resultant injection-molded body are shown in Table 3.

TABLE 3

| Examples | MFR (g/10 min) | Flexural modulus (MPa) | Izod impact strength (KJ/m²) | Heat deflection temperature (° C.) |
|---|---|---|---|---|
| Example 12 | 23.8 | 1066 | 37.2 | 79 |
| Example 13 | 20.2 | 1025 | 29.6 | 76 |
| Example 14 | 20.4 | 1117 | 36.0 | 84 |
| Example 15 | 20.1 | 1099 | 30.1 | 82 |
| Comparative Example 2 | 23.3 | 1033 | 15.5 | 76 |
| Comparative Example 3 | 21.9 | 985 | 29.1 | 81 |
| Comparative Example 4 | 21.4 | 969 | 35.1 | 74 |
| Example 16 | 23.1 | 1071 | 41.5 | 78 |
| Comparative Example 5 | 24.4 | 1020 | 13.5 | 72 |
| Example 17 | 41.2 | 1052 | 40.5 | 81 |
| Example 18 | 38.9 | 1004 | 38.6 | 79 |
| Example 19 | 45.5 | 968 | 28.2 | 76 |
| Example 20 | 37.9 | 991 | 27.7 | 80 |
| Example 21 | 43.2 | 1021 | 36.8 | 80 |
| Example 22 | 46.0 | 991 | 30.9 | 81 |
| Example 23 | 39.2 | 962 | 33.2 | 78 |
| Example 24 | 41.2 | 936 | 34.0 | 75 |
| Comparative Example 6 | 45.9 | 913 | 14.8 | 76 |
| Comparative Example 7 | 41.1 | 922 | 26.7 | 73 |
| Comparative Example 8 | 43.7 | 905 | 32.7 | 74 |
| Comparative Example 9 | 39.3 | 892 | 25.2 | 72 |
| Comparative Example 10 | 43.1 | 847 | 23.2 | 71 |

The invention claimed is:

1. A propylene polymer composition
comprising the following components (A), (B), and (C) and
satisfying the requirements (1) to (4):
Component (A): a propylene polymer comprising a structural unit derived from propylene in an amount of 90% by weight or more when the total weight of the propylene polymer is 100% by weight;
Component (B): at least one elastomer selected from the group consisting of an ethylene-α-olefin copolymer having a structural unit derived from ethylene in an amount of more than 10% by weight and 99% by weight or less when the total weight of the ethylene-α-olefin copolymer is 100% by weight and a structural unit derived from an α-olefin having 3 to 10 carbon atoms and a hydrogenated conjugated diene polymer;
Component (C): a propylene block copolymer comprising
a propylene polymerization block (I) having a structural unit derived from propylene in an amount of 90% by weight or more when the total weight of the propylene polymerization block is 100% by weight and
at least one elastomer block (II) selected from the group consisting of an ethylene-α-olefin copolymer block having a structural unit derived from ethylene in an amount of more than 10% by weight and 99% by weight or less when the total weight of the ethylene-α-olefin copolymer block is 100% by weight and a structural unit derived from an α-olefin having 3 to 10 carbon atoms and a hydrogenated conjugated diene polymer block;
Requirement (1): the propylene polymer composition has a melting point of 100° C. or more;
Requirement (2): the propylene polymer composition has a limiting viscosity of 1.0 dl/g or more;
Requirement (3): at least one of the number-average molecular weight of a component insoluble in p-xylene at 25° C. of the propylene polymer composition and the number-average molecular weight of a component insoluble in n-heptane at 25° C. of the propylene polymer composition is 80000 or more; and
Requirement (4): the ratio of the polystyrene-equivalent number-average molecular weight of the component (A) to the polystyrene-equivalent number-average molecular weight of the component (B) is 1.5 or more and 20 or less.

2. The propylene polymer composition according to claim 1, wherein the propylene polymer composition has a melting point of 145° C. or more.

3. The propylene polymer composition according to claim 1, wherein the sum of the content of the component (B) contained in the component insoluble in p-xylene at 25° C. and the content of the elastomer block (II) of the component (C) contained in the component insoluble in p-xylene at 25° C. is 5 to 50% by weight when the amount of the component insoluble in p-xylene at 25° C. is 100% by weight.

4. The propylene polymer composition according to claim 1, wherein the sum of the content of the component (B) contained in the component insoluble in n-heptane at 25° C. and the content of the elastomer block (II) of the component (C) contained in the component insoluble in n-heptane at 25° C. is 5 to 50% by weight when the amount of the component insoluble in n-heptane at 25° C. is 100% by weight.

5. The propylene polymer composition according to claim 1, wherein the content of the component (C) is 50% by weight or more when the total weight of the propylene polymer composition is 100% by weight.

6. The propylene polymer composition according to claim 1, wherein the component (B) is an ethylene-propylene copolymer, the elastomer block (II) of the component (C) is an ethylene-propylene copolymer block, and the composition satisfies the following Requirement (5):
Requirement (5): at least one of the absolute value of the difference between α and γ and the absolute value of the difference between β and γ is 10 or less,
when the content of a structural unit derived from ethylene contained in a component insoluble in p-xylene at 25° C. of the propylene polymer composition is α % by weight when the sum of the content of the ethylene-propylene copolymer and the content of the ethylene-propylene copolymer block contained in the component insoluble in p-xylene at 25° C. is 100% by weight, the content of a structural unit derived from ethylene contained in a component insoluble in n-heptane at 25° C. is β % by weight when the sum of the content of the ethylene-propylene copolymer and the content of the ethylene-propylene copolymer block contained in the component insoluble in h-heptane at 25° C. is 100% by weight, and the sum of the content of a structural unit derived from ethylene contained in the ethylene-propylene copolymer and the content of a structural unit derived from ethylene contained in the ethylene-propylene copolymer block is γ % by weight when the sum of the content of the ethylene-propylene copolymer and the content of the ethylene-propylene copolymer block in the propylene polymer composition is 100% by weight.

7. The propylene polymer composition according to claim 1, wherein
the component (B) is an ethylene-α-olefin copolymer having a structural unit derived from ethylene in an amount of more than 10% by weight and 99% by weight or less when the total weight of the ethylene-α-olefin copolymer is 100% by weight and a structural unit derived from an α-olefin having 4 to 10 carbon atoms,
the elastomer block (II) of the component (C) is an ethylene-α-olefin copolymer block having a structural unit derived from ethylene in an amount of more than 10% by weight and 99% by weight or less when the total weight of the ethylene-α-olefin copolymer block is 100% by weight and a structural unit derived from an α-olefin having 4 to 10 carbon atoms,
the number of short chain branches of the ethylene-α-olefin copolymer is 10 to 200 when a total number of carbon atoms is 1000, and
the number of short chain branches of the ethylene-α-olefin copolymer block is 10 to 200 when a total number of carbon atoms is 1000.

8. The propylene polymer composition according to claim 1, wherein
the component (B) is the hydrogenated conjugated diene polymer,
the elastomer block (II) of the component (C) is the hydrogenated conjugated diene polymer block,
the number of short chain branches of the above-described hydrogenated conjugated diene polymer is 10 to 200 when a total number of carbon atoms is 1000, and
the number of short chain branches of the above-described hydrogenated conjugated diene polymer block is 10 to 200 when a total number of carbon atoms is 1000.

9. The propylene polymer composition according to claim 1, wherein the ratio of the polystyrene-equivalent weight-average molecular weight of the propylene polymer composition to the polystyrene-equivalent number-average molecular weight of the propylene polymer composition is 1.5 or more and 3.0 or less.

10. A mixture of
a material (D) and the propylene polymer composition according claim 1, wherein
at least one of the content of a component insoluble in p-xylene at 25° C. in polymer components contained in the mixture and the content of a component insoluble in n-heptane at 25° C. in polymer components contained in the mixture is 50 to 95% by weight when the total weight of the polymer components contained in the mixture is 100% by weight;
Material (D): a heterophasic propylene polymer comprising a component (i) and a component (ii)
Component (i): a propylene polymer;
Component (ii): an ethylene-based copolymer.

11. The mixture according to claim 10 further comprising an inorganic filler, wherein
the content of the inorganic filler is 1 to 40% by weight when the total weight of the mixture is 100% by weight.

* * * * *